(12) United States Patent
Kumar et al.

(10) Patent No.: US 12,520,174 B2
(45) Date of Patent: Jan. 6, 2026

(54) HANDLING OF NR QoE MEASUREMENTS AND QoE REPORTING IN RRC MODES

(71) Applicant: QUALCOMM Incorporated, San Diego, CA (US)

(72) Inventors: Rajeev Kumar, San Diego, CA (US); Xipeng Zhu, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 17/646,922

(22) Filed: Jan. 4, 2022

(65) Prior Publication Data
US 2022/0217560 A1 Jul. 7, 2022

Related U.S. Application Data

(60) Provisional application No. 63/136,581, filed on Jan. 12, 2021, provisional application No. 63/133,964, filed on Jan. 5, 2021.

(51) Int. Cl.
*H04W 24/08* (2009.01)
*H04W 28/02* (2009.01)

(52) U.S. Cl.
CPC ....... *H04W 24/08* (2013.01); *H04W 28/0268* (2013.01)

(58) Field of Classification Search
None
See application file for complete search history.

(56) References Cited

U.S. PATENT DOCUMENTS

| 10,212,636 B2 | 2/2019 | Damnjanovic et al. |
| 2013/0286868 A1 | 10/2013 | Oyman et al. |
| 2014/0016464 A1 | 1/2014 | Shirazipour et al. |
| 2015/0043336 A1* | 2/2015 | Zhu ........... H04W 28/0268 370/230 |

(Continued)

FOREIGN PATENT DOCUMENTS

| JP | 2016213805 A | 12/2016 |
| WO | 2016094173 A1 | 6/2016 |

(Continued)

OTHER PUBLICATIONS

3GPP TS 28.405 V16.0.0 ((Jul. 2020)) (Year: 2020).*

(Continued)

*Primary Examiner* — Andre Tacdiran
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for handling of QoE measurements. In aspects, a UE may transmit, to a base station, an indication of one or more UE capabilities for at least one of multiple instances or simultaneous instances of one or more QoE measurements at the UE associated with one or more types of services, and receive, from the base station, a QoE measurement information configuration for the QoE measurement information associated with the one or more types of services based on the indication that of the one or more UE capabilities.

27 Claims, 15 Drawing Sheets

(56) References Cited

U.S. PATENT DOCUMENTS

| | | | | |
|---|---|---|---|---|
| 2015/0312894 | A1* | 10/2015 | Chen | H04W 16/18 |
| | | | | 370/329 |
| 2019/0045578 | A1* | 2/2019 | Oyman | H04L 43/0852 |
| 2020/0112907 | A1* | 4/2020 | Dao | H04W 4/40 |
| 2020/0153712 | A1 | 5/2020 | Miao et al. | |
| 2020/0252823 | A1* | 8/2020 | Kim | H04W 48/16 |
| 2020/0374726 | A1* | 11/2020 | Harada | H04B 7/0695 |
| 2020/0413301 | A1 | 12/2020 | Shi et al. | |
| 2023/0044291 | A1* | 2/2023 | Bergström | H04W 48/12 |
| 2023/0216751 | A1* | 7/2023 | Barac | H04L 45/24 |
| | | | | 455/423 |
| 2023/0231779 | A1* | 7/2023 | Centonza | H04W 24/10 |
| | | | | 370/252 |
| 2023/0403590 | A1* | 12/2023 | Rune | H04W 24/08 |

FOREIGN PATENT DOCUMENTS

| | | | |
|---|---|---|---|
| WO | 2020069662 | A1 | 4/2020 |
| WO | 2020252339 | A1 | 12/2020 |
| WO | 2021098074 | A1 | 5/2021 |
| WO | 2021201522 | A1 | 10/2021 |
| WO | WO2022005356 | * | 1/2022 |

OTHER PUBLICATIONS

3GPP_TR 38.890 (Jan. 4, 2021) (Year: 2021).*
Luca—U.S. Appl. No. 63/046,161 (Year: 2020).*
Barac—U.S. Appl. No. 63/046,183 (Year: 2020).*
Centonza—U.S. Appl. No. 63/046,224 (Year: 2020).*
"3rd Generation Partnership Project, Technical Specification Group Radio Access Network, Study on NR QoE Management and Optimizations for Diverse Services (Release 17)", 3GPP Standard Technical Report, 3GPP TR 38.890, 3rd Generation Partnership Project (3GPP), Mobile Competence Centre, 650, Route Des Lucioles, F-06921 Sophia-Antipolis Cedex, France, vol. RAN WG3, No. V0.2.0, Jan. 4, 2021, pp. 1-12, XP051999784, Retrieved from the Internet: URL: https://ftp.3gpp.org/Specs/archive/38_series/38.890/38890-020.zip [Retrieved on Jan. 4, 2021].
CATT: "Discussion on NR QoE Solution Architecture and Interface Impact", 3GPP Draft, R3-205360, 3GPP TSG-RAN WG3 #109-e, 3rd Generation Partnership Project (3GPP), Mobile Competence Centre, 650, Route Des Lucioles, F-06921 Sophia-Antipolis Cedex, France, vol. RAN WG3, No. Online, Aug. 17, 2020-Aug. 28, 2020, Aug. 7, 2020 (Aug. 7, 2020), XP051916026, 3 Pages, Retrieved from the Internet: URL:https://ftp.3gpp.org/tsg_ran/WG3_lu/TSGR3_109-e/Docs/R3-205360.zip, R3-205360 NR-QoE-Architec.doc [retrieved on Aug. 7, 2020] Sections 1-2.
Ericsson: "pCR for TR 38.8xx: NR QoE Measurement Triggering, Configuration, Collection and Reporting", R3-205201, 3GPP TSG-RAN WG3 Meeting #109-e, Online, Aug. 17-27, 2020, pp. 5-6, pp. 1-6, XP051915875, Retrieved from the Internet: URL: https://ftp.3gpp.org/tsg_ran/WG3_lu/TSGR3_109-e/Docs/R3-205201 zip R3-205201 -Pcr for TR 38.8xx NR QoE Measurement Triggering, Configuration, Collection and Reporting.docx Retrieved on [Aug. 7, 2020], The Whole Document.
Ericsson: "(TP for QoE BL CR for TS38.413): QoE Configuration and Reporting", 3GPP Draft, 3GPP TSG-RAN WG3 Meeting #114-e, R3-214727, 3rd Generation Partnership Project (3GPP), Mobile Competence Centre, 650, Route Des Lucioles, F-06921 Sophia-Antipolis Cedex, France, vol. RAN WG3, No. Online, Nov. 1, 2021-Nov. 11, 2021, Oct. 22, 2021 (Oct. 22, 2021), XP052067729, 14 Pages, Retrieved from the Internet: URL: https://ftp.3gpp.org/tsg_ran/WG3_lu/TSGR3_114-e/Docs/R3-214727.zip [Retrieved on Oct. 22, 2021] The Whole Document.
Huawei: "Potential RAN3 Impacts About QoE Measurement", 3GPP Draft, 3GPP TSG-RAN WG3 #109-e, R3-205283, 3rd Generation Partnership Project (3GPP), Mobile Competence Centre, 650, Route Des Lucioles, F-06921 Sophia-Antipolis Cedex, France, vol. RAN WG3, No. E-Meeting, Aug. 17, 2020-Aug. 28, 2020, Aug. 7, 2020 (Aug. 7, 2020), XP051915949, 6 Pages, Retrieved from the Internet: URL: https://ftp.3gpp.org/tsg_ran/WG3_lu/TSGR3_109-e/Docs/R3-205283.zip [Retrieved on Aug. 7, 2020] The Whole Document.
International Search Report and Written Opinion—PCT/US2022/011339—ISA/EPO—Apr. 26, 2022.
Qualcomm Incorporated: "Fast SCell Configuration and Activation through Network Assisted RRC_Idle Mode Measurements", 3GPP TSG-RAN2 Meeting #99, R2-1707788, Berlin, Germany, Aug. 21-25, 2017, 5 Pages, XP051317748, Retrieved from the Internet: URL: http://www.3gpp.org/ftp/Meetings_3GPP_SYNC/RAN2/Docs/ clause 3, section 1-3.

* cited by examiner

HANDLING OF NR QoE MEASUREMENTS AND QoE REPORTING IN RRC MODES

CROSS REFERENCE TO RELATED APPLICATION(S)

This application claims the benefit of and priority to U.S. Provisional Application Ser. No. 63/136,581, entitled "Handling of NR QoE Measurements" and filed on Jan. 12, 2021, and U.S. Provisional Application Ser. No. 63/133,964, entitled "Quality of Experience Reporting in Radio Resource Control Modes" and filed on Jan. 5, 2021, which are expressly incorporated by reference herein in their entireties.

TECHNICAL FIELD

The present disclosure relates generally to communication systems, and more particularly, to handling of quality of experience (QoE) measurements and QoE reporting in radio resource control (RRC) modes.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Information associated with a quality of experience (QoE) measurement performed at a user equipment (UE) may be transmitted to a radio access network (RAN) in a format that may not be decodable by the RAN. However, the RAN may forward the QoE measurement information received from the UE to a QoE server, which may decode the QoE measurement information. Thus, even though the RAN may receive QoE measurement parameters from the UE, the RAN may not be able to decode the QoE measurement parameters for purposes of increasing a performance of the RAN.

Accordingly, the UE may determine a capability of the UE for performing QoE measurements, and may indicate such capabilities to the RAN prior to performing the QoE measurements and reporting the QoE measurement information to the RAN. The UE may be configured with QoE measurements, triggering/reporting information, and/or configured to report RAN decodable parameters to the RAN. The RAN decodable parameters may be decoded at the RAN for increasing the performance of the RAN. For example, an adjustment to a reported QoE measurement parameter decoded at the RAN may increase the performance of the RAN.

In an aspect of the disclosure, a method, a computer-readable medium, and an apparatus are provided. The apparatus may be associated with a user equipment (UE) and configured to transmit, to a base station, an indication of one or more UE capabilities for at least one of multiple instances or simultaneous instances of one or more QoE measurements at the UE associated with one or more types of services; and receive, from the base station, a QoE measurement information configuration for reporting QoE measurement information associated with the one or more types of services based on the indication of the one or more UE capabilities for the at least one of the multiple instances or the simultaneous instances of the one or more QoE measurements.

In another aspect of the disclosure, a method, a computer-readable medium, and an apparatus are provided. The apparatus may be associated with a base station and configured to receive, from a UE, an indication of one or more UE capabilities for at least one of multiple instances or simultaneous instances of one or more QoE measurements associated with one or more types of services at the UE; identify whether the base station can decode QoE measurement information for the one or more QoE measurements based on at least one of the multiple instances or the simultaneous instances of the one or more QoE measurements at the UE or a second indication from an operations, administration and maintenance (OAM) server; and transmit, to the UE, a QoE measurement information configuration for a report of the QoE measurement information based on whether the base station can decode the QoE measurement information for the one or more QoE measurements.

In another aspect of the disclosure, a method, a computer-readable medium, and an apparatus are provided. The apparatus may be associated with a UE and configured to obtain, in association with a UE capabilities indication that the UE supports QoE measurements while in a radio resource control (RRC) idle mode or an RRC inactive mode, a set of QoE measurements associated with a service type; and transmit the obtained set of QoE measurements while in the RRC idle mode or the RRC inactive mode, after entering an RRC connected mode, the set of QoE measurements.

In another aspect of the disclosure, a method, a computer-readable medium, and an apparatus are provided. The apparatus may be associated with a UE and configured to obtain, in association with a UE capabilities indication that UE supports QoE measurements while in an RRC idle mode or an RRC inactive mode, one or more QoE measurements associated with a service type; and initiate an RRC connection setup or an RRC connection resume based at least in part on obtaining the one or more QoE measurements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
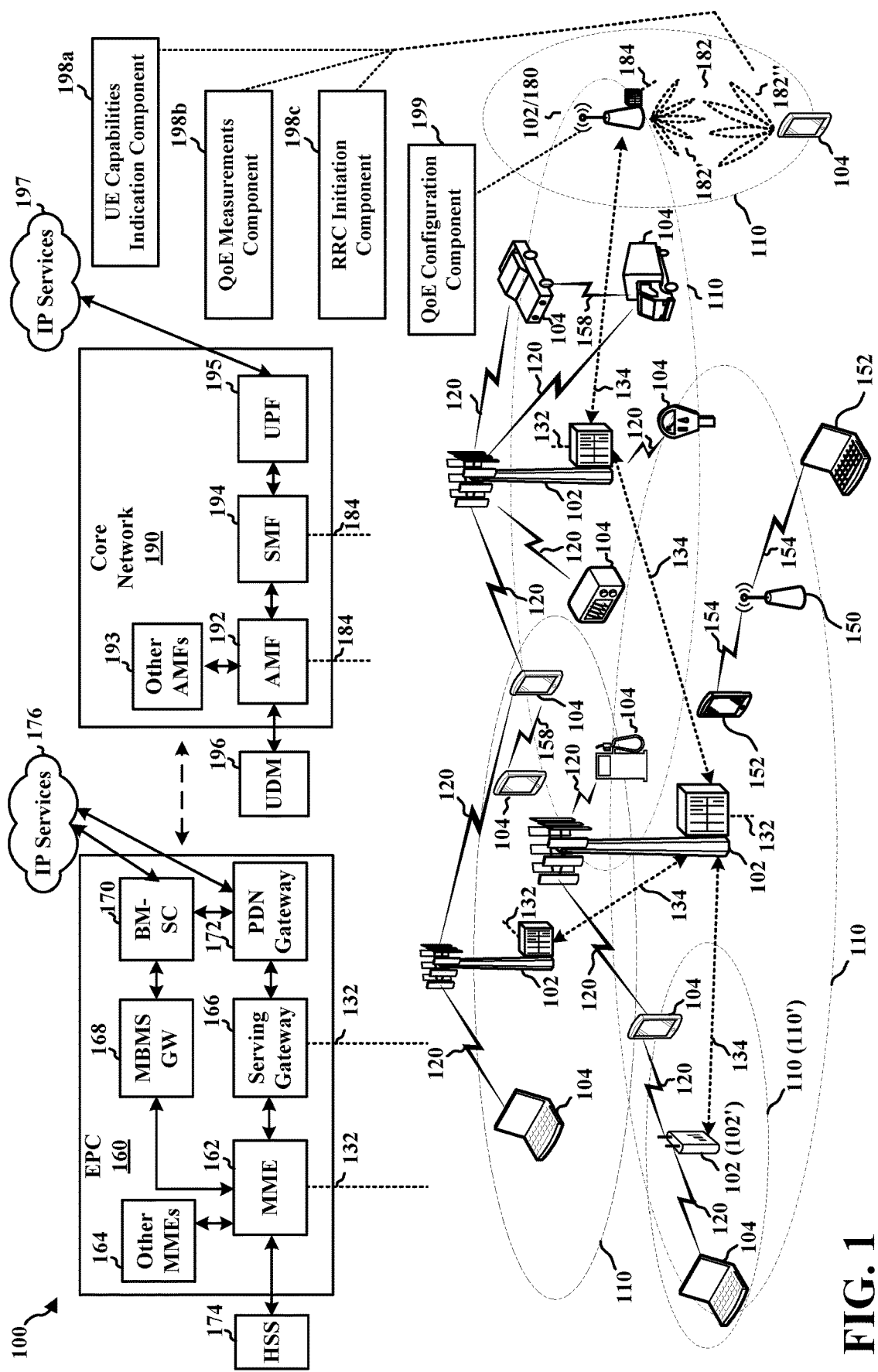
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE

104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE capabilities indication component 198*a* configured to transmit, to a base station, an indication of one or more UE capabilities for at least one of multiple instances or simultaneous instances of one or more QoE measurements associated with one or more types of services; and receive, from the base station, a QoE measurement information configuration for reporting QoE measurement information associated with the one or more types of services based on the indication of the one or more UE capabilities for the at least one of the multiple instances or the simultaneous instances of the one or more QoE measurements. In certain aspects, the UE 104 may include a QoE measurements component 198*b* configured to obtain, in association with a UE capabilities indication that the UE supports QoE measurements while in a radio resource control (RRC) idle mode or an RRC inactive mode, a set of QoE measurements associated with a service type; and transmit the obtained set of QoE measurements while in the RRC idle mode or the RRC inactive mode, after entering an RRC connected mode, the set of QoE measurements. In certain aspects, the UE 104 may include an RRC initiation component 198*c* configured to obtain, in association with a UE capabilities indication that UE supports QoE measurements while in an RRC idle mode or an RRC inactive mode, one or more QoE measurements associated with a service type; and initiate an RRC connection setup or an RRC connection resume based at least in part on obtaining the one or more QoE measurements.

In certain aspects, the base station 180 may include a QoE configuration component 199 configured to receive, from a UE, an indication of one or more UE capabilities for at least one of multiple instances or simultaneous instances of one or more QoE measurements associated with one or more types of services at the UE; identify whether the base station can decode QoE measurement information for the one or more QoE measurements based on the indication of the one or more UE capabilities for the at least one of the multiple instances or the simultaneous instances of the one or more QoE measurements at the UE or a second indication from an operations, administration and maintenance (OAM) server; and transmit, to the UE, a QoE measurement information configuration for a report of the QoE measurement information based on whether the base station can decode the QoE measurement information for the one or more QoE measurements. Although the following description may be focused on 5G NR, the concepts described herein may be applicable to other similar areas, such as LTE, LTE-A, CDMA, GSM, and other wireless technologies.

Figure 2:
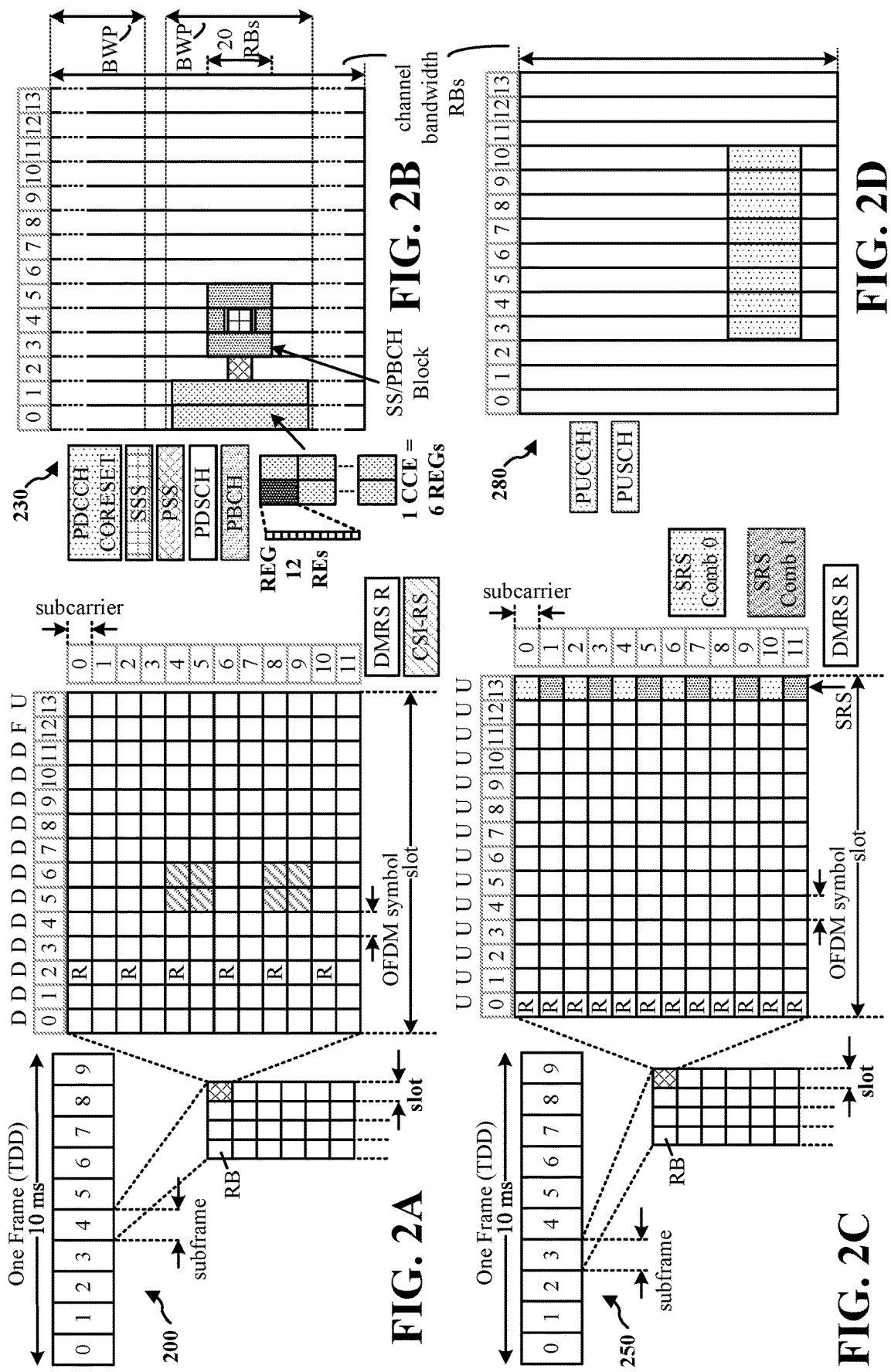
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
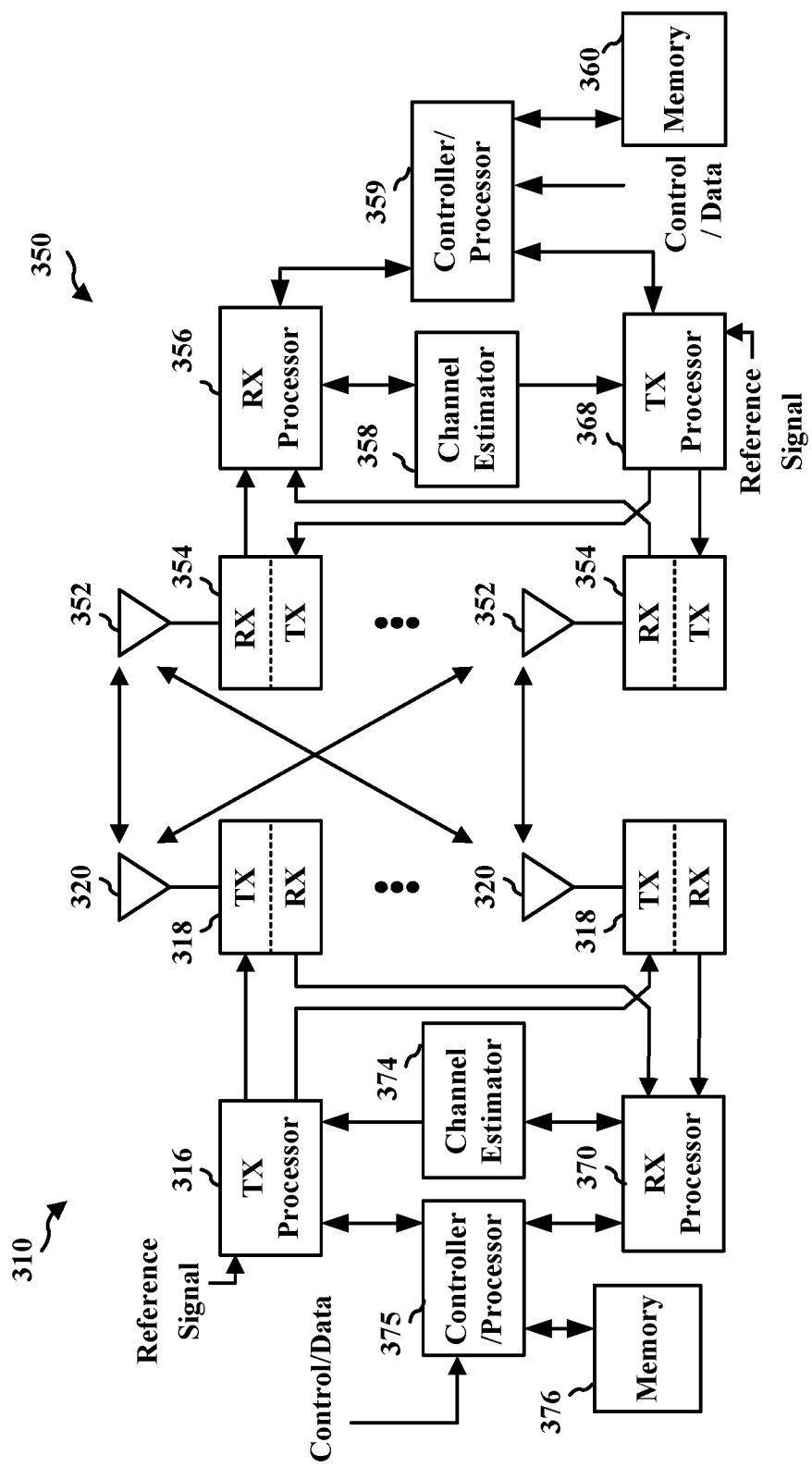
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE capabilities indication component 198a, the QoE measurements component 198b, and/or the RRC initiation component 198c of FIG. 1.

At least one of the TX processor 316, the RX processor 370, and the controller/processor 375 may be configured to perform aspects in connection with the QoE configuration component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
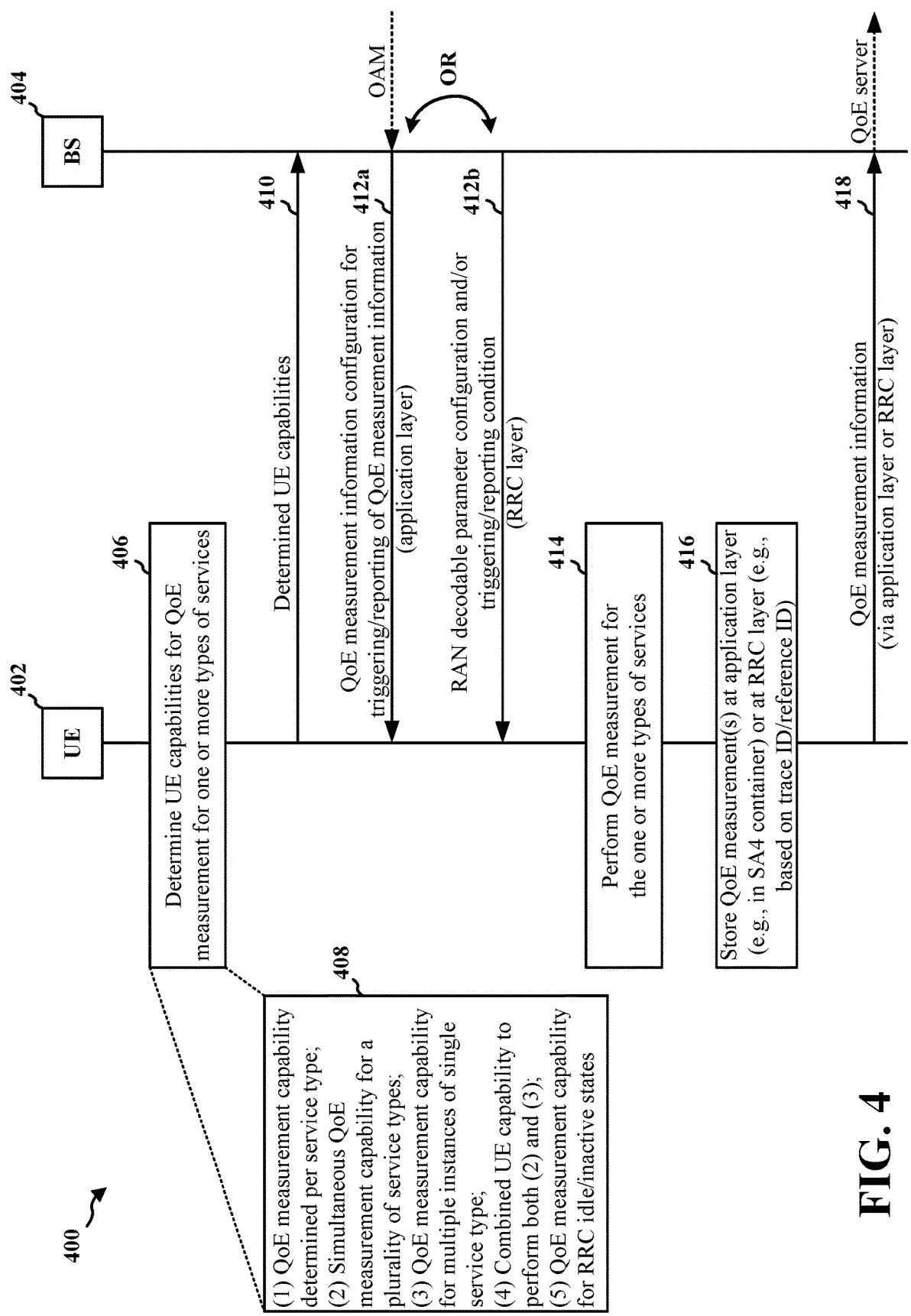
FIG. 4 is a call flow diagram illustrating communications between a UE and a base station.

FIG. 4 is a call flow diagram 400 illustrating communications between a UE 402 and a base station 404. At 406, the UE 402 may determine UE capabilities for performing a quality of experience (QoE) measurement for one or more types of services. QoE may correspond to an actual or expected level of satisfaction with a quality of a telecommunication service from a perspective of an end user (e.g., based on objective criteria). For instance, "QoE" may refer to a measure of service parameters that are determined to provide a basis for user enjoyment of the service. Thus, the QoE may be determined with less emphasis on the scope of a measured parameter and with more emphasis on factors/parameters that are determined to provide the basis for user enjoyment of the service.

The QoE may be based on information indicated within data transmitted over a network, rather than based on an efficiency of the data transmission. A performance of the network determined based on a QoE measurement for a defined metric may correspond to an expected satisfaction level of the end user in regard to the defined metric. For example, where the type of service is augmented reality/virtual reality (AR/VR), the QoE measurement may be associated with a measured rate of change of a focal point corresponding to a head position of the user. If the frames of the AR/VR application are updated quickly enough to track adjustments in the head position of the user, the QoE measurement assigned to such metric (e.g., focal point changes) may be high. Other types of services may include multimedia telephony services for IMS (MTSI), multimedia broadcast multicast services (MBMS), etc.

The UE capability determined, at 406, may be based on a number of UE capabilities 408. For example, a first UE capability 408(1) may be that a QoE measurement capability is determined per service type. A second UE capability 408(2) may be a simultaneous QoE measurement capability for a plurality of service types. A third UE capability 408(3) may be a QoE measurement capability for multiple instances of a single service type. A fourth UE capability 408(4) may be a combined UE capability to perform both the second UE capability 408(2) and the third UE capability 408(3) simultaneously. A fifth UE capability 408(5) may be a QoE measurement capability for an RRC idle state or an RRC inactive state of the UE 402. The UE 402 may transmit, at 410, an indication of the determined UE capabilities to the base station 404, based on the UE capabilities determined, at 406 (e.g., in association with the number of UE capabilities 408).

At 412a, the UE 402 may receive a RAN decodable QoE measurement information configuration from an OAM server for the UE application layer, via the base station 404, which may include triggering/reporting information for one or more QoE measurements of the UE 402. The triggering/reporting information may be received at the UE 402 as an application layer triggering/reporting condition. Alternatively, at 412b, the UE 402 may receive, from the RAN/base station 404, a RAN decodable parameter configuration (e.g., for storing the QoE measurement) and/or an indication of a trigger/reporting condition for reporting the QoE measurement to the base station 404. The information received, at 412b, by the UE 402 may be received for the RRC layer.

At 414, the UE 402 may perform the QoE measurement for the one or more types of services. At 416, the QoE measurement(s) may be stored at the application layer (e.g., in a system architecture 4 (SA4) container) or at the RRC layer (e.g., based on a trace identifier (ID) or a reference ID). The UE 402 may transmit, at 418, the QoE measurement information to the base station 404 via the application layer or the RRC layer. In configurations where the QoE measurement information is stored at the application layer in the SA4 container or other application layer container, the UE 402 may transmit, at 418, the QoE measurement information to the base station 404 or to the QoE server via the base station 404.

In some cases, QoE measurement information associated with QoE measurements performed at the UE 402 may be transmitted to a RAN/base station 404 in an SA4 container or other application layer container that may not be decodable by the RAN/base station 404. The base station 404 may forward the container received from the UE 402 to a QoE server, which may extract the QoE measurement information included in the container. Thus, even though the base station 404 may receive QoE measurement parameters from the UE 402 via the container, the base station 404 may not be configured to decode the QoE measurement parameters for purposes of increasing a performance at the base station 404.

Accordingly, the UE 402 may be configured to determine, at 406, capabilities of the UE 402 for performing QoE measurements, and may indicate such UE capabilities, at 410, to the base station 404 prior to performing the QoE measurements, at 414, and reporting the QoE measurement information, at 418, to the base station 404. In aspects, the QoE measurement may be performed, at 414, in association with simultaneous QoE measurements of the UE 402 (e.g., for different service types), RAN-decodable QoE measurement parameters, processing techniques for QoE measurements while the UE 402 is in an idle state or an inactive state, mechanisms for reporting, at 418, the QoE measurement information to the RAN including the base station 404, etc.

An example QoE measurement may be associated with adjusting a focal point for an AR/VR application. For instance, a QoE measurement parameter of the UE 402 may indicate a rate of change of the focal point based on a changed head position of the user of the AR/VR application. If the network is able to update frames of the AR/VR application quickly enough to maintain pace with a changing perspective of the user, the QoE of the user may be at or above a defined threshold. If the network is unable to update the frames of the AR/VR application quickly enough to maintain pace with the changing perspective of the user, the QoE of the user may be improved. Hence, if the QoE parameter transmitted to the base station 404 is decodable by the base station 404, the QoE parameter may be utilized by the base station 404 to improve the QoE at the UE 402 when the QoE is below the defined threshold (e.g., via changes to the QoE parameter).

QoE parameters may be utilized for a number of NR applications. For example, QoE measurements of the UE 402 may be associated with MTSI, MBMS, etc. As multiple types of measurements may be performed, at 414, by the UE 402 for measuring the QoE, the UE 402 may be configured to perform, at 414, the QoE measurements for certain service types, but may not be configured to perform the QoE measurements for other service types. Thus, a capability of the UE 402 may be defined per service type (e.g., based on 408(1)). That is, different UE capabilities may be determined, at 406, for different QoE service types (e.g., determined based on 408(1)). If the UE 402 supports a plurality of service types, the UE 402 may indicate a desire to perform QoE measurements, at 414, for a first subset of the plurality of service types and to not perform QoE measurements for a second subset of the plurality of service types. For instance, the UE 402 may determine to perform QoE measurements, at 414, for MTSI applications, but may determine not to perform measurements for AR/VR applications. As such, the UE 402 may indicate to the base station 404 that QoE measurements may be performed, at 414, for MTSI applications but not performed for AR/VR applications.

The UE 402 may be configured to perform, at 414, simultaneous QoE measurements for the plurality of service types and/or multiple instances of QoE measurements for a single service type. For example, the UE 402 may perform, at 414, a QoE measurement on a plurality of different occasions, where the service type may be AR/VR for each of the different occasions. Thus, the UE 402 may obtain QoE measurement information for the single service type (e.g., AR/VR) based on performing, at 414, the QoE measurements over time for the single service type. The UE 402 may indicate to the base station 404 whether the UE 402 is configured to perform, at 414, simultaneous QoE measurements for the plurality of service types (e.g., via the determination at 408(2)). The UE 402 may also indicate to the base station 404 whether the UE 402 is configured to perform, at 414, the multiple instances of QoE measurements for the single service type (e.g., via the determination at 408(3)). In a first aspect, the UE 402 may be independently configured to perform, at 414, the simultaneous QoE measurements for the plurality of service types and/or the multiple instances of QoE measurements of the single service type. In a second aspect, the UE 402 may indicate to the base station 404 (e.g., via the determination at 408(4)) that the UE capability includes both performing the simultaneous QoE measurements for the plurality of service types and performing the multiple instances of QoE measurements of the single service type. A bit stream (e.g., associated with a 2-bit UE capability) may be used to indicate whether the UE 402 is configured to perform, at 414, the simultaneous QoE measurements for the plurality of service types and/or the multiple instances of QoE measurements of the single service type.

For some service types, such as MBMS, the UE 402 may perform, at 414, QoE measurements in an RRC idle state or an RRC inactive state (e.g., via the determination at 408(5)). To indicate a capability of the UE 402 for performing QoE measurements in the idle state or the inactive state, the UE 402 may transmit a separate indication to the base station 404 of whether the UE 402 is configured to perform, at 414, the QoE measurements in the idle state or the inactive state. In examples, the indication may be applicable to all service types. That is, the UE 402 may perform, at 414, the QoE measurements in the idle state or the inactive state for each service type of the one or more service types. Whether the UE 402 is configured to perform, at 414, the QoE measurements in the idle state or the inactive state may be based on the UE capability for a particular service type. If the UE 402 indicates a capability to perform QoE measurements for a service type, the indication may be applicable to all RRC states (e.g., notwithstanding of a current RRC state). The UE 402 may additionally provide separate indications per service type for an RRC connected state and the RRC idle/inactive states.

RAN decodable parameters associated with the QoE measurements performed, at 414, may be reported, at 418, to the base station 404 via an application layer. In examples, even though a rate of change of the focal point of the user of the AR/VR application may be used for improving the QoE of the user, the base station 404 may not be configured to read/decode the measurement information associated with a corresponding QoE measurement. Thus, measurement information for the QoE measurement may be transmitted to the base station 404 in a standardized format that may be decodable by the base station 404.

In a first aspect, the RAN decodable parameters may be stored, at 416, at the application layer. For QoE parameters that may not be decodable at the application layer by the RAN, the SA4 container or other application layer container may be used to define a number of generalized QoE parameters based on the service type associated with the QoE measurement performed, at 414, at the application layer. The QoE parameters may be provided to the RRC layer in a separate container that the RAN/base station 404 may decode and utilize for increasing a performance of the RAN/base station 404. The base station 404 may not be configured to decode a QoE measurement report of the container (e.g., a larger report generated for optimizations of the application layer). Thus, the RAN decodable container may be used for providing RAN decodable QoE measurement parameters to the base station 404. If the UE 402 receives a request from the base station 404 or if a trigger condition occurs, both RAN decodable and non-decodable QoE measurement information may be transmitted from the application to a modem. The modem may subsequently forward the QoE measurements to the base station 404, which may decode the RAN decodable parameters and forward the non-decodable parameters (e.g., non-decodable QoE measurements) to a QoE server. In a second aspect, the RAN decodable parameters may be stored, at 416, at the RRC layer, where the base station 404 may process the QoE measurement information per service type based on predefined techniques.

RAN decodable parameters may be requested by the base station 404 and may be configured by the OAM server. For example, the base station 404 may transmit a request to the OAM server to configure RAN decodable QoE parameters. The OAM server may configure the RAN decodable parameters for the QoE measurements within the SA4 container or other application layer container. That is, the OAM server may indicate a decoding procedure for the QoE measurements at the application layer. The container including the RAN decodable parameters may be different from a container including parameters that are not decodable by the base station 404. RAN decodable parameters included in the containers may be requested periodically by the base station 404 for increasing the performance of the RAN/base station 404.

A trigger condition for reporting, at 418, to the base station 404, a RAN decodable report and/or an SA4 container/application layer container including QoE parameters may be defined via the container or the RAN. The trigger condition for reporting, at 418, the RAN decodable report to the base station 404 may be based on a different trigger condition than a trigger condition for transmitting the QoE container to the base station 404. Each of the RAN decodable measurement parameters and the non-decodable measurement parameters may be independently reported, at 418, to the base station 404 or reported together, at 418, to the base station 404. The reporting configuration may be based on the trigger condition of the reporting, at 418, to the base station 404.

If simultaneous QoE measurements are performed, at 414, both RAN decodable and non-decodable QoE measurement parameters may be maintained at the application layer (e.g., stored at 416). The RAN decodable QoE measurement parameters may include a QoE satisfaction level, application layer throughput, delay, jitter, etc. Separate reporting triggers may be configured for the SA4 container/application layer container (e.g., per service type and/or per trace identifier (ID)/reference ID) for reporting, at 418, the QoE measurement information per service type and/or per reference ID. The trace ID/reference ID may be used to differentiate QoE measurements performed, at 414, for the multiple instances of the single service type or to differentiate the simultaneous QoE measurements performed, at 414, for the plurality of service types (e.g., based on the UE capability determined at 408(2)-408(4)). A first trigger condition may be defined at the application layer and a second trigger condition may be defined by the RAN. That is, separate reporting triggers may be configured (e.g., per service type or per trace ID/reference ID) at the RAN for reporting the QoE measurements per service type and/or per trace ID/reference ID.

In another aspect, a QoE measurement configuration may be used to configure a single service type and/or a single instance of the single service type. Application layer measurement configurations may be indicative of an area configuration and the RAN decodable parameters. If the UE 402 is configured to perform, at 414, a plurality of QoE measurements, separate QoE configurations may be transmitted from the base station 404 to the UE 402 for performing the plurality of QoE measurements. In a further aspect, a QoE configuration may be used to configure the plurality of service types and/or the multiple instances of the single service type. The QoE measurement configuration may be used for the area configuration and the RAN decodable parameters for the plurality of service types, which may be measured simultaneously. In some cases, a parameter of the UE 402 may be indicative of a storage area configuration and/or RAN decodable QoE measurements per service types.

Figure 5:
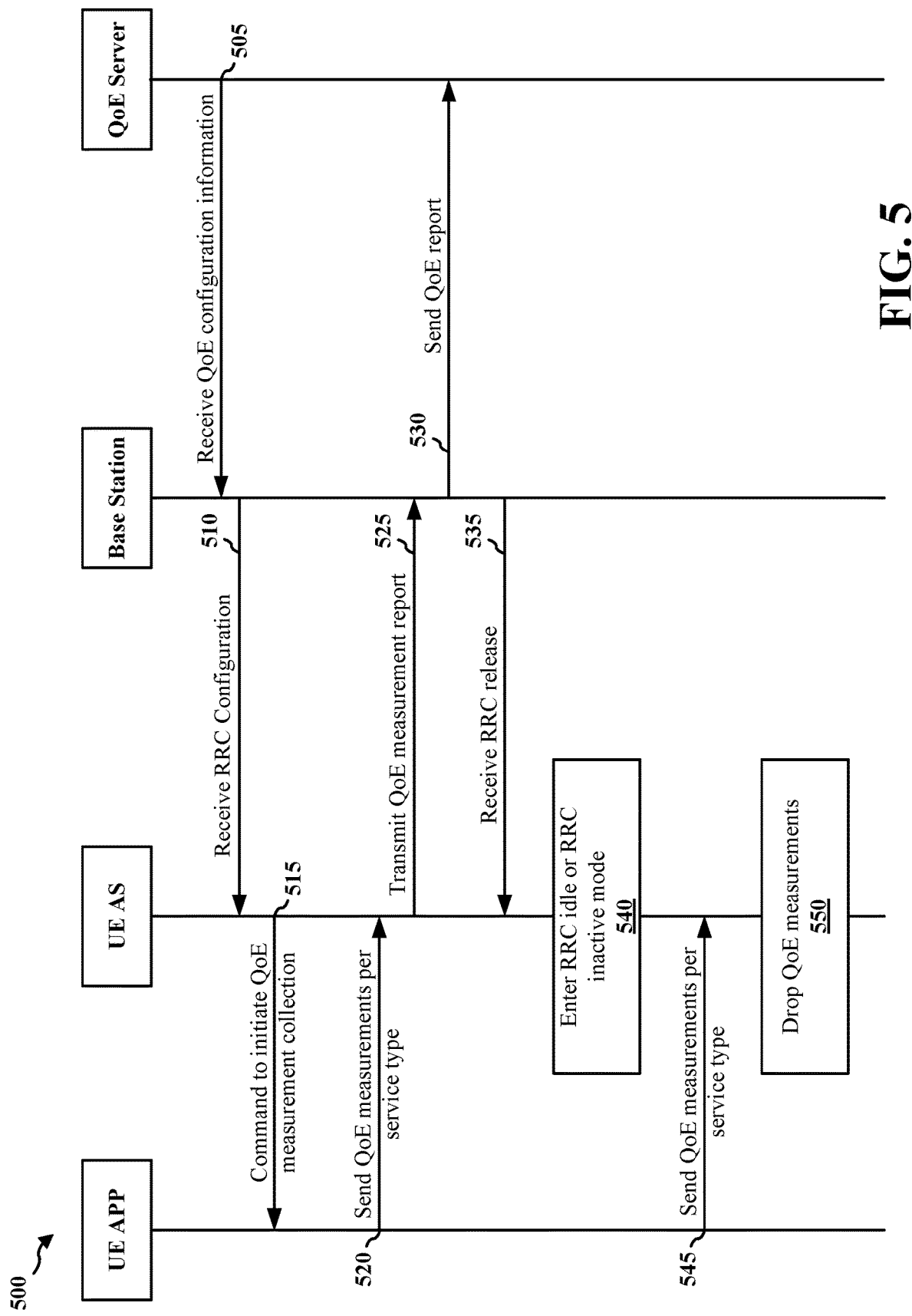
FIG. 5 is a call flow diagram illustrating an example of quality of experience (QoE) reporting.

FIG. 5 is a call flow diagram illustrating an example 500 of QoE reporting, in accordance with various aspects of the present disclosure. As shown in FIG. 5, a UE may include an application layer (e.g., a high-level operating system (HLOS)) and an access stratum (AS) layer. The application layer (UE APP) may be associated with an application instance on the UE. The AS layer (UE AS) may be associated with a wireless link between the UE and a base station. The base station may be associated with a cell of a wireless network, which may provide a connection to a QoE server. The QoE server may include, may be a part of, or may be associated with, an application that is associated with the application instance on the UE.

As shown by reference number 505, the base station may receive, and the QoE server may send, QoE configuration information. The QoE configuration information may indicate one or more parameters, associated with the application, to be measured. For example, the QoE configuration information may indicate that the UE is to measure throughput, latency, or error rates, among other examples. Additionally, or alternatively, the QoE configuration information may indicate one or more parameters associated with measuring the one or more parameters. For example, the QoE configuration information may indicate a periodicity of measurements of the QoE parameters, a periodicity of reporting the measurements of the QoE, or a service type (e.g., an application type), among other examples.

As shown by reference number 510, the UE may receive at the UE AS, and the base station may transmit, an RRC configuration. The RRC configuration may include, and/or may indicate, a measurement configuration for the application layer (e.g., measConfigAppLayer). The measurement configuration for the application layer may include, and/or may indicate, the QoE configuration information and/or a service type of the application (e.g., streaming and/or multimedia broadcast multicast service (MBMS), among other examples).

As shown by reference number 515, the UE AS may send a command (e.g., may indicate) to the UE application layer to initiate QoE measurement collection (QMC). The UE AS may send the command via an interface between the UE AS and the UE application layer, such as a wireless m-bus sensor interfacing module (MSM). The command may include an attention (AT) command.

As shown by reference number 520, the UE application layer may send QoE measurements per service type (e.g., per application and/or per application type, among other examples). For example, the UE application layer may send a first set of QoE measurements associated with the application and/or a second set of QoE measurements associated with an additional application.

As shown by reference number 525, the UE AS layer may transmit, and the base station may receive, a QoE measurement report (e.g., a measReportAppLayer). The QoE measurement report may include a QoE report and/or a service type (e.g., application or application type, among other examples). For example, the QoE measurement report may indicate a set of QoE measurements and associated service types.

As shown by reference number 530, the base station may send, and the QoE server may receive, a QoE report. The QoE report may include one or more indications of QoE measurements associated with the QoE server. For example, the QoE report may include one or more elements of the QoE measurement report that are associated with the application.

As shown by reference number 535, the UE may receive, and the base station may transmit, an RRC release (e.g., an RRCRelease). The RRC release may indicate that the UE is to enter RRC idle mode or RRC inactive mode. The RRC release may release a signaling radio bearer (SRB) associated with an uplink communication from the UE (e.g., an SRB4).

As shown by reference number 540, the UE may enter RRC idle mode or RRC inactive mode. While in RRC idle mode or RRC inactive mode, the UE may not be configured with resources to transmit a QoE measurement report.

As shown by reference number 545, the UE application layer may send QoE measurements per service type to the UE AS layer. For example, the UE application layer may continue obtaining the QoE measurements during the RRC idle mode or RRC inactive mode, based at least in part on the QoE configuration information. The UE may continue to receive signaling associated with the application while in RRC idle mode or RRC inactive mode. For example, the UE may continue to receive signaling via MBMS and/or sidelink communications, among other examples.

As shown by reference number 550, the UE AS layer may drop the QoE measurements based at least in part on the UE being in RRC idle mode or RRC inactive mode. In other words, the UE may not transmit, and/or may discard, the QoE measurements received from the UE application layer while the UE is in RRC idle mode or RRC inactive mode.

Based at least in part on the UE not transmitting, and/or discarding, the QoE measurements, the QoE server may fail to receive the QoE measurements. Based at least in part on the QoE server failing to receive the QoE measurements, an application server associated with the QoE (not shown in FIG. 5) may fail to optimize communication with the UE. For example, the application server may fail to modify a stream of data to the UE that is optimized for the measurements of the QoE (e.g., streaming resolution and/or allowed streaming types, among other examples). In this way, the UE may receive a degraded exchange of application data with the application server, which may consume processing, network, and/or communication resources to detect and correct.

As indicated above, FIG. 5 is provided as an example. Other examples may differ from what is described with regard to FIG. 5.

In some aspects described herein, a UE may transmit a set of QoE measurements obtained while the UE is in RRC idle mode or RRC inactive mode. In this way, an application server that is associated with a QoE server may receive QoE measurements obtained while the UE is in RRC idle mode or RRC inactive mode. Based at least in part on the QoE server receiving the QoE measurements, the application server may improve communication with the UE. For example, the application server may modify a stream of data to the UE that is optimized for the measurements of the QoE (e.g., streaming resolution and/or allowed streaming types, among other examples). In this way, the UE may achieve an improved exchange (e.g., transmission and/or reception) of application data with the application server, which may conserve processing, network, and/or communication resources that may have otherwise been consumed to detect and correct a degraded exchange of application data.

In some aspects, the UE AS layer may provide, to the UE application layer, an indication to stop sending QoE measurements (e.g., based at least in part on the UE entering RRC idle mode or RRC inactive mode). The UE application layer may store the QoE measurements based at least in part on the indication. The UE AS layer may provide (e.g., based at least in part on entering an RRC connected mode) an indication that the UE application layer is to resume sending QoE measurements. Based at least in part on the indication to resume sending the QoE measurements, the UE application layer may send the QoE measurements by service type to the UE AS layer. The UE AS layer may transmit a QoE measurement report to the base station, which may include one or more QoE measurements obtained while the UE was in RRC idle mode or RRC inactive mode.

In some aspects, the UE application layer may obtain one or more QoE measurements while in RRC idle mode or RRC inactive mode. The UE application layer may provide QoE measurements per service type to the UE AS layer. Based at least in part receiving the QoE measurements, the UE AS layer may initiate an RRC connection setup or RRC connection resume to receive an allocation of resources to use for transmitting a QoE measurement report.

In some aspects, the UE may be configured to perform one or more operations for reporting QoE measurements while in RRC idle mode or RRC inactive mode. For example, the UE may be configured (e.g., via a communication protocol, configuration information from the base station or another base station, or a dynamic indication from the base station or another base station, among other examples) to stop sending QoE measurements to the UE AS layer while in RRC idle mode or RRC inactive mode or may be configured to initiate an RRC connection setup or RRC connection resume based at least in part on the UE AS layer receiving one or more QoE measurements.

Figure 6:
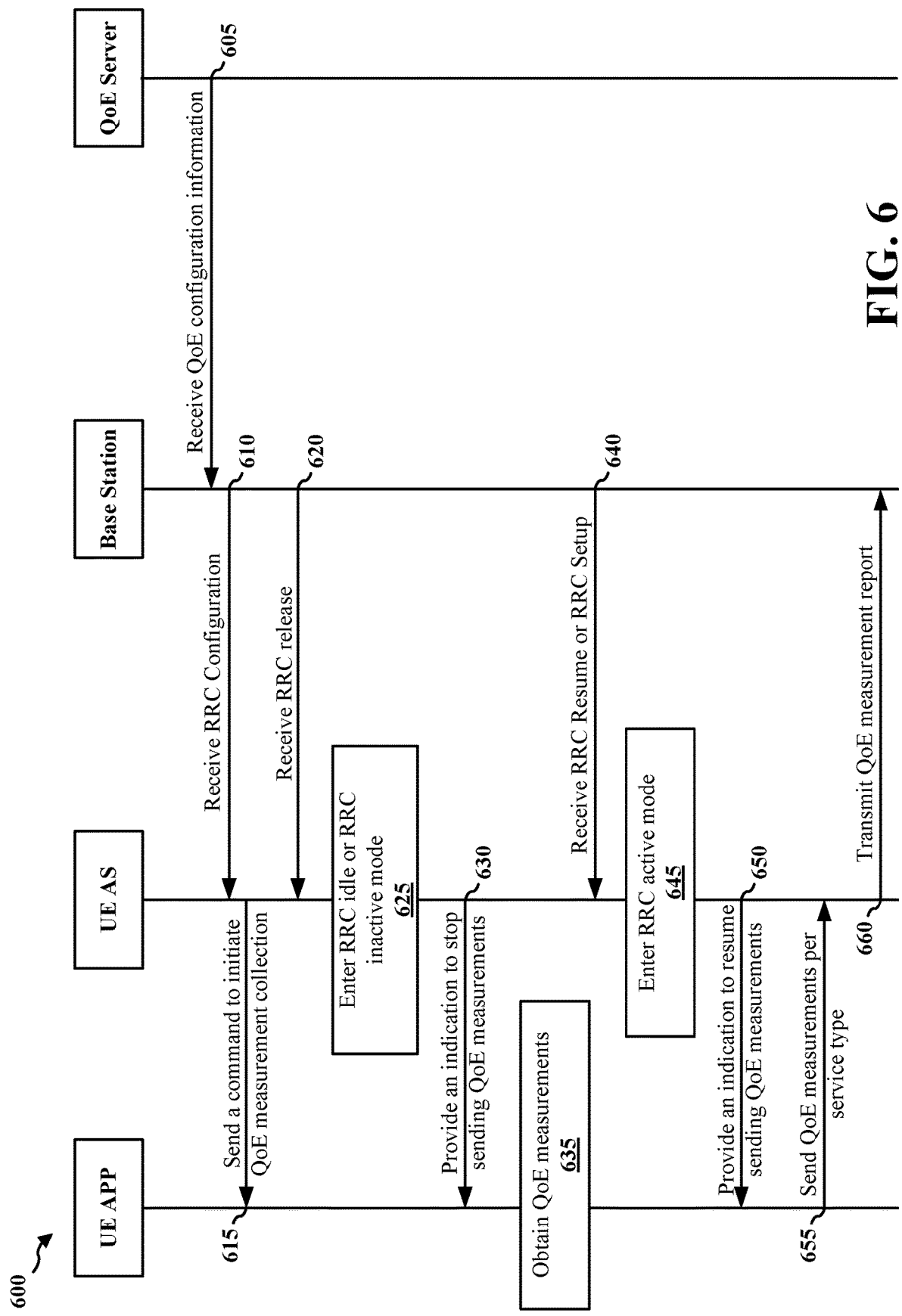
FIG. 6 is a call flow diagram illustrating an example associated with QoE reporting in radio resource control (RRC) modes.

FIG. 6 is a call flow diagram illustrating an example 600 associated with QoE reporting in radio resource control modes, in accordance with various aspects of the present disclosure. As shown in FIG. 6, a UE (e.g., UE 104) may communicate with a base station (e.g., base station 102). The UE and the base station may be part of a wireless network (e.g., access network 100). In some aspects, the UE may communicate with a QoE server and/or an application server associated with the QoE server via the wireless network. In some aspects, the base station may communicate with the QoE server and/or the application server to support communications between the UE and the QoE server and/or between the UE and the application server.

As shown by reference number 605, the base station may receive, and the QoE server may send, QoE configuration information. In some aspects, the QoE configuration information may indicate one or more parameters, associated with the application, to be measured. For example, the QoE configuration information may indicate that the UE is to measure throughput, latency, or error rates, among other examples. Additionally, or alternatively, the QoE configuration information may indicate one or more parameters associated with measuring the one or more parameters. For example, the QoE configuration information may indicate a periodicity of measurements of the QoE parameters, a periodicity of reporting the measurements of the QoE, or a service type (e.g., an application type), among other examples.

In some aspects, the QoE configuration information may indicate that the UE is to report QoE measurements that are obtained while the UE is in RRC idle mode or RRC inactive mode. In some aspects, the QoE configuration information may indicate that the UE is to report QoE measurements that are obtained while the UE is in RRC idle mode or RRC inactive mode based at least in part on the UE satisfying one or more conditions. For example, the conditions may include the UE remaining within a current tracking area or a current radio access network-based notification area. Additionally, or alternatively, the conditions may include the UE remaining within a set of tracking areas and/or a set of radio access network-based notification areas, among other examples.

As shown by reference number 610, the UE may receive, and the base station may transmit, an RRC configuration (e.g., RRCConfig, RRCReconfiguration, and/or measConfigAppLayer, among other examples) via the UE AS layer. The RRC configuration may include a QoE configuration and/or an indication of a service type associated with QoE measurements. In some aspects, the RRC configuration may indicate that the UE is to perform one or more operations associated with obtaining and/or reporting QoE measurements that are associated with the QoE server. In some aspects, the RRC configuration may indicate that the UE is in an RRC connected state.

As shown by reference number 615, the UE AS layer may send a command to initiate QoE measurement collection. In some aspects, the command may include an AT command via an interface between the UE AS layer and the UE application layer. In some aspects, the command to initiate QoE measurement collection may indicate one or more parameters for the UE to obtain (e.g., measure) and/or report the QoE measurements. For example, the command to initiate the QoE measurement collection may indicate a periodicity of measurements of the QoE parameters, or a periodicity of reporting the measurements of the QoE, among other examples. In some aspects, the UE may collect and report QoE measurements while in RRC connected mode (e.g., as shown in FIG. 5).

As shown by reference number 620, the UE may receive, and the base station may transmit, an RRC release via the UE AS layer. In some aspects, the RRC release may indicate that the UE is to continue obtaining QoE measurements while in the RRC idle mode or the RRC inactive mode. In some aspects, the RRC release may indicate that the UE is to continue obtaining QoE measurements while in the RRC idle mode or the RRC inactive mode based at least in part on the UE remaining in a current tracking area or a current radio access network-based notification area. For example, the RRC release may indicate that the UE is to continue obtaining QoE measurements unless or until the UE performs a reselection process. In some aspects, the RRC release may provide an associated indication via a Boolean flag.

In some aspects, the RRC release may indicate that the UE is to continue obtaining QoE measurements while in the RRC idle mode or the RRC inactive mode based at least in part on the UE remaining in a set of tracking areas or a set of radio access network-based notification areas. For example, the RRC release may indicate that the UE is to continue obtaining QoE measurements unless or until the UE performs a reselection process and determines that a reselected cell is not in the set of tracking areas or the set of radio access network-based notification areas. In some aspects, the RRC release may provide indications of the set of tracking areas or the set of radio access network-based notification areas.

As shown by reference number 625, the UE may enter RRC idle mode or RRC inactive mode. For example, the UE may enter RRC idle mode or RRC inactive mode based at least in part on the RRC release received from the base station. In some aspects, the RRC release may release a signaling radio bearer (SRB) associated with an uplink communication from the UE (e.g., an SRB4). In this way, the UE may be unable to transmit a QoE measurement report.

As shown by reference number 630, the UE AS layer may provide an indication to stop sending QoE measurements. For example, the UE may provide the indication, from the UE AS layer associated with a service type (e.g., an application), based at least in part on the UE entering RRC idle mode or RRC inactive mode. In some aspects, the UE AS layer may provide the indication based at least in part on the RRC release indicating that the UE is to transmit QoE measurements obtained while the UE is in RRC idle mode or RRC inactive mode. Based at least in part on the UE AS layer providing the indication, the UE application layer may preserve the QoE measurements that may otherwise have been dropped at the UE AS layer based at least in part on the UE being in the RRC idle mode or RRC inactive mode.

In some aspects, the UE AS layer may provide the indication to stop sending QoE measurements based at least in part on the UE satisfying one or more conditions. For example, the conditions may include the UE remaining in a current tracking area or a current radio access network-based notification area. Additionally, or alternatively, the conditions may include the UE remaining in a set of tracking areas or a set of radio access network-based notification areas.

As shown by reference number 635, the UE may obtain QoE measurements (e.g., a set of one or more QoE measurements) while in RRC idle mode or RRC inactive mode. In some aspects, the UE (e.g., at the UE application layer) may store the QoE measurements based at least in part on the UE being in the RRC idle mode or the RRC inactive mode (e.g., based at least in part on the indication to stop sending the QoE measurements).

As shown by reference number 640, the UE may receive an RRC resume or an RRC setup from the base station. As shown by reference number 645, the UE may enter an RRC active mode (e.g., based at least in part on the UE receiving the RRC resume or RRC setup from the base station). Based at least in part on the UE entering the RRC active mode, the UE may be configured with an SRB associated with resources for transmitting a QoE measurement report.

As shown by reference number 650, the UE AS layer may provide an indication to resume sending QoE measurements. In some aspects, the indication may include an AT command. In some aspects, the UE AS layer may provide the indication based at least in part on a previous transmission of the indication to stop sending QoE measurements. In some aspects, the UE AS layer may provide the indication based at least in part on the UE entering the RRC active mode.

In some aspects, the UE AS layer may provide an indication to resume sending QoE measurements based at least in part on the UE failing to satisfy one or more conditions for transmitting a QoE measurement report for QoE measurements obtained while in RRC idle mode or RRC inactive mode. In some aspects, the UE AS layer may provide the indication to resume sending QoE measurements based at least in part on the UE performing a cell reselection process or based at least in part on the UE determining that a reselected cell is not in the set of tracking areas or the set of radio access network-based notification areas, among other examples.

As shown by reference number 655, the UE application layer may send QoE measurements per service type. In some aspects, the UE application layer may send QoE measurements that the UE stored while the UE was in RRC idle mode or RRC inactive mode.

As shown by reference number 660, the UE AS layer may transmit, and the base station may receive, a QoE measurement report. The QoE measurement report may include and/or indicate one or more QoE measurements obtained while the UE was in RRC idle mode or RRC inactive mode.

The base station may send, to the QoE server, a QoE report based at least in part on the QoE measurement report.

Based at least in part on the UE transmitting a set of QoE measurements obtained while the UE is in RRC idle mode or RRC inactive mode, an application server that is associated with the QoE server may receive the QoE measurements obtained while the UE is in RRC idle mode or RRC inactive mode. Based at least in part on the QoE server receiving the QoE measurements, the application server may improve communication with the UE. For example, the application server may modify a stream of data to the UE that is optimized for the measurements of the QoE (e.g., streaming resolution and/or allowed streaming types, among other examples). In this way, the UE may receive an improved exchange of application data with the application server, which may conserve processing, network, and/or communication resources that may have otherwise been consumed to detect and correct a degraded exchange of application data.

As indicated above, FIG. 6 is provided as an example. Other examples may differ from what is described with regard to FIG. 6.

Figure 7:
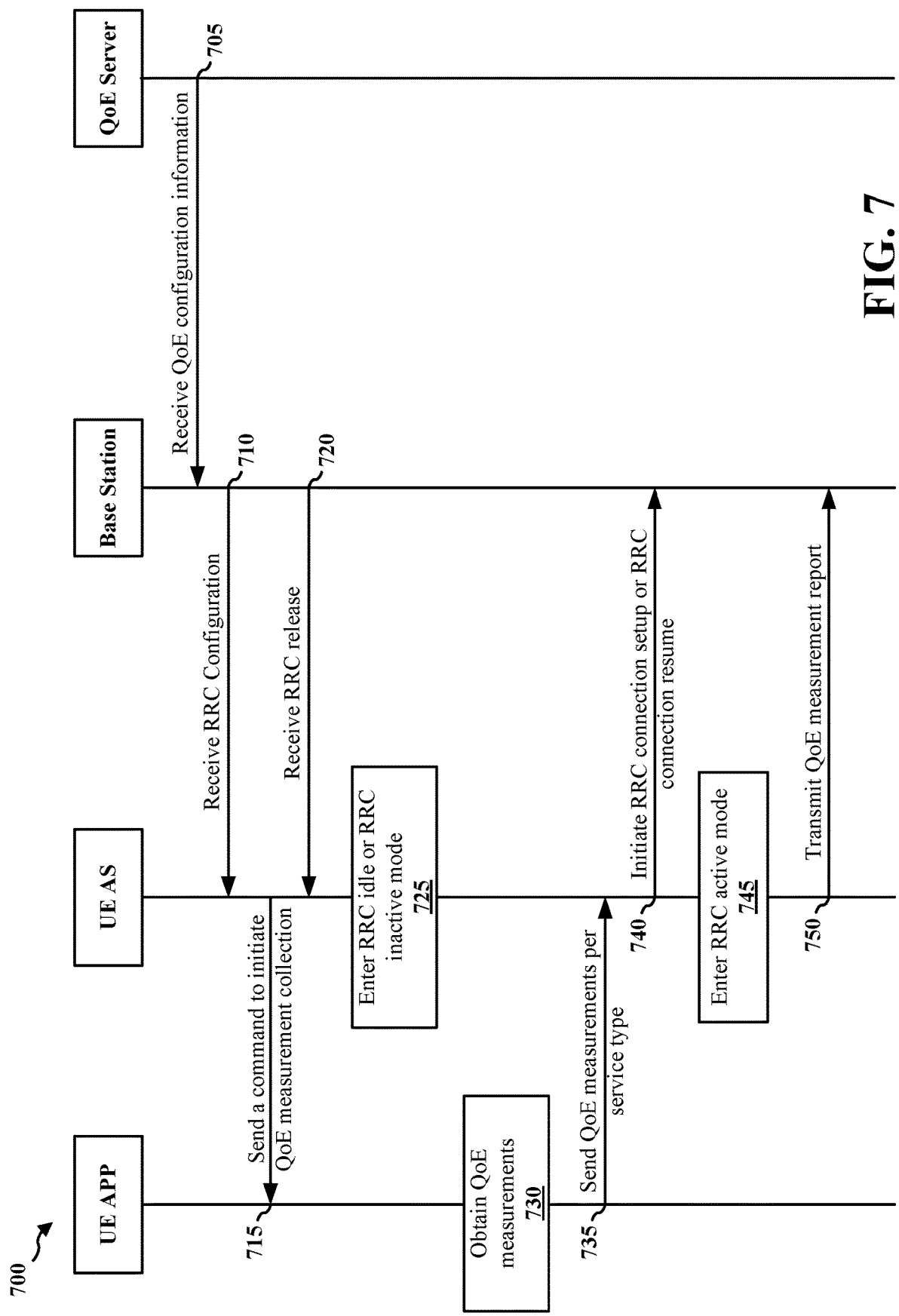
FIG. 7 is a call flow diagram illustrating an example associated with QoE reporting in RRC modes.

FIG. 7 is a call flow diagram illustrating an example 700 associated with QoE reporting in radio resource control modes, in accordance with various aspects of the present disclosure. As shown in FIG. 7, a UE (e.g., UE 104) may communicate with a base station (e.g., base station 102). The UE and the base station may be part of a wireless network (e.g., access network 100). In some aspects, the UE may communicate with a QoE server and/or an application server associated with the QoE server via the wireless network. In some aspects, the base station may communicate with the QoE server and/or the application server to support communications between the UE and the QoE server and/or between the UE and the application server.

As shown by reference number 705, the base station may receive, and the QoE server may send, QoE configuration information. In some aspects, the QoE configuration information may indicate one or more parameters, associated with the application, to be measured. For example, the QoE configuration information may indicate that the UE is to measure throughput, latency, or error rates, among other examples. Additionally, or alternatively, the QoE configuration information may indicate one or more parameters associated with measuring the one or more parameters. For example, the QoE configuration information may indicate a periodicity of measurements of the QoE parameters, a periodicity of reporting the measurements of the QoE, or a service type (e.g., an application type), among other examples.

In some aspects, the QoE configuration information may indicate that the UE is to report QoE measurements that are obtained while the UE is in RRC idle mode or RRC inactive mode. In some aspects, the QoE configuration information may indicate that the UE is to report QoE measurements that are obtained while the UE is in RRC idle mode or RRC inactive mode based at least in part on the UE satisfying one or more conditions. For example, the conditions may include the UE remaining within a current tracking area or a current radio access network-based notification area. Additionally, or alternatively, the conditions may include the UE remaining within a set of tracking areas and/or a set of radio access network-based notification areas, among other examples.

As shown by reference number 710, the UE may receive, and the base station may transmit, an RRC configuration (e.g., RRCConfig, RRCReconfiguration, and/or measConfigAppLayer, among other examples) via the UE AS layer.

The RRC configuration may include a QoE configuration and/or an indication of a service type associated with QoE measurements. In some aspects, the RRC configuration may indicate that the UE is to perform one or more operations associated with obtaining and/or reporting QoE measurements that are associated with the QoE server. In some aspects, the RRC configuration may indicate that the UE is in an RRC connected state.

As shown by reference number 715, the UE AS layer may send a command to initiate QoE measurement collection. In some aspects, the command may include an AT command via an interface between the UE AS layer and the UE application layer. In some aspects, the command to initiate QoE measurement collection may indicate one or more parameters for the UE to obtain (e.g., measure) and/or report the QoE measurements. For example, the command to initiate the QoE measurement collection may indicate a periodicity of measurements of the QoE parameters, or a periodicity of reporting the measurements of the QoE, among other examples. In some aspects, the UE may collect and report QoE measurements while in RRC connected mode (e.g., as shown in FIG. 5).

As shown by reference number 720, the UE may receive, and the base station may transmit, an RRC release via the UE AS layer. In some aspects, the RRC release may indicate that the UE is to continue obtaining QoE measurements while in the RRC idle mode or the RRC inactive mode. In some aspects, the RRC release may indicate that the UE is to initiate RRC connection setup or RRC connection resume based at least in part on the UE obtaining a QoE measurement. In some aspects, the RRC release may indicate that the UE is to initiate RRC connection setup or RRC connection resume based at least in part on the UE obtaining a number of QoE measurements that satisfies a QoE measurements threshold.

As shown by reference number 725, the UE may enter RRC idle mode or RRC inactive mode. For example, the UE may enter RRC idle mode or RRC inactive mode based at least in part on the RRC release received from the base station. In some aspects, the RRC release may release a signaling radio bearer (SRB) associated with an uplink communication from the UE (e.g., an SRB4). In this way, the UE may be unable to transmit a QoE measurement report.

As shown by reference number 730, the UE may obtain one or more QoE measurements (e.g., a set of one or more QoE measurements) while in RRC idle mode or RRC inactive mode. In some aspects, the UE (e.g., at the UE application layer) may store a number of QoE measurements until the number of QoE measurements satisfies a QoE measurements threshold.

As shown by reference number 735, the UE application layer may send the one or more QoE measurements per service type to the UE AS layer. In some aspects, the UE application layer may send QoE measurements that the UE stored while the UE was in RRC idle mode or RRC inactive mode.

As shown by reference number 740, the UE AS layer may initiate an RRC connection setup or RRC connection resume. In some aspects, the UE may initiate the RRC connection setup or RRC connection resume using a random access channel process. In some aspects, the UE may initiate the RRC connection setup based at least in part on the UE obtaining the one or more QoE measurements, based at least in part on the UE remaining in a current tracking area or a current radio access network-based notification area, and/or the UE remaining in a set of tracking areas or a set of radio access network-based notification areas, among other examples.

As shown by reference number 745, the UE may enter RRC active mode. In some aspects, the UE may enter the RRC active mode based at least in part on the UE receiving the RRC resume or RRC setup from the base station. Based at least in part on the UE entering the RRC active mode, the UE may be configured with an SRB associated with resources for transmitting a QoE measurement report.

As shown by reference number 750, the UE may transmit, and the base station may receive, a QoE measurement report. The QoE measurement report may include and/or indicate one or more QoE measurements obtained while the UE was in RRC idle mode or RRC inactive mode. The base station may send, to the QoE server, a QoE report based at least in part on the QoE measurement report.

Based at least in part on the UE transmitting one or more QoE measurements obtained while the UE is in RRC idle mode or RRC inactive mode, an application server that is associated with the QoE server may receive the QoE measurements obtained while the UE is in RRC idle mode or RRC inactive mode. Based at least in part on the QoE server receiving the QoE measurements, the application server may improve communication with the UE. For example, the application server may modify a stream of data to the UE that is optimized for the measurements of the QoE (e.g., streaming resolution and/or allowed streaming types, among other examples). In this way, the UE may receive an improved exchange of application data with the application server, which may conserve processing, network, and/or communication resources that may have otherwise been consumed to detect and correct a degraded exchange of application data.

As indicated above, FIG. 7 is provided as an example. Other examples may differ from what is described with regard to FIG. 7.

Figure 8:
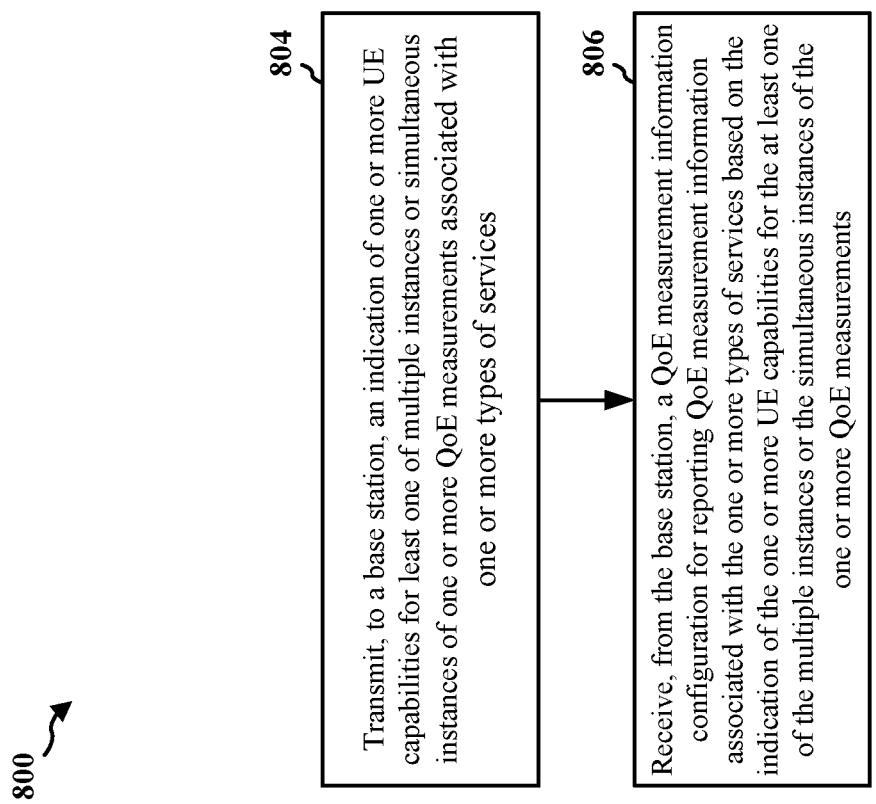
FIG. 8 is a flowchart of a method of wireless communication at a UE.

FIG. 8 is a flowchart 800 of a method of wireless communication. The method may be performed by a UE (e.g., the UE 104/402; the apparatus 1402; etc.), which may include the memory 360 and which may be the entire UE 104/402 or a component of the UE 104/402, such as the TX processor 368, the RX processor 356, and/or the controller/processor 359.

At 804, the UE may transmit, to a base station, an indication of one or more UE capabilities for least one of multiple instances or simultaneous instances of one or more QoE measurements associated with one or more types of services. For example, referring to FIG. 4, the UE 402 may transmit, at 410, the configured/determined UE capabilities to the base station 404. The transmission, at 804, may be performed by the transmission component 1434 of the apparatus 1402 in FIG. 14.

At 806, the UE may receive, from the base station, a QoE measurement information configuration for reporting QoE measurement information associated with the one or more types of services based on the indication of the one or more UE capabilities for the at least one of the multiple instances or the simultaneous instances of the one or more QoE measurements. For example, referring to FIG. 4, the UE 402 may receive, at 412a, a QoE measurement information configuration for triggering and/or reporting of QoE measurement information from the base station 404 based on the configured/determined UE capabilities transmitted, at 410, to the base station 404. The reception, at 806, may be performed by the reception component 1430 of the apparatus 1402 in FIG. 14.

Figure 9:
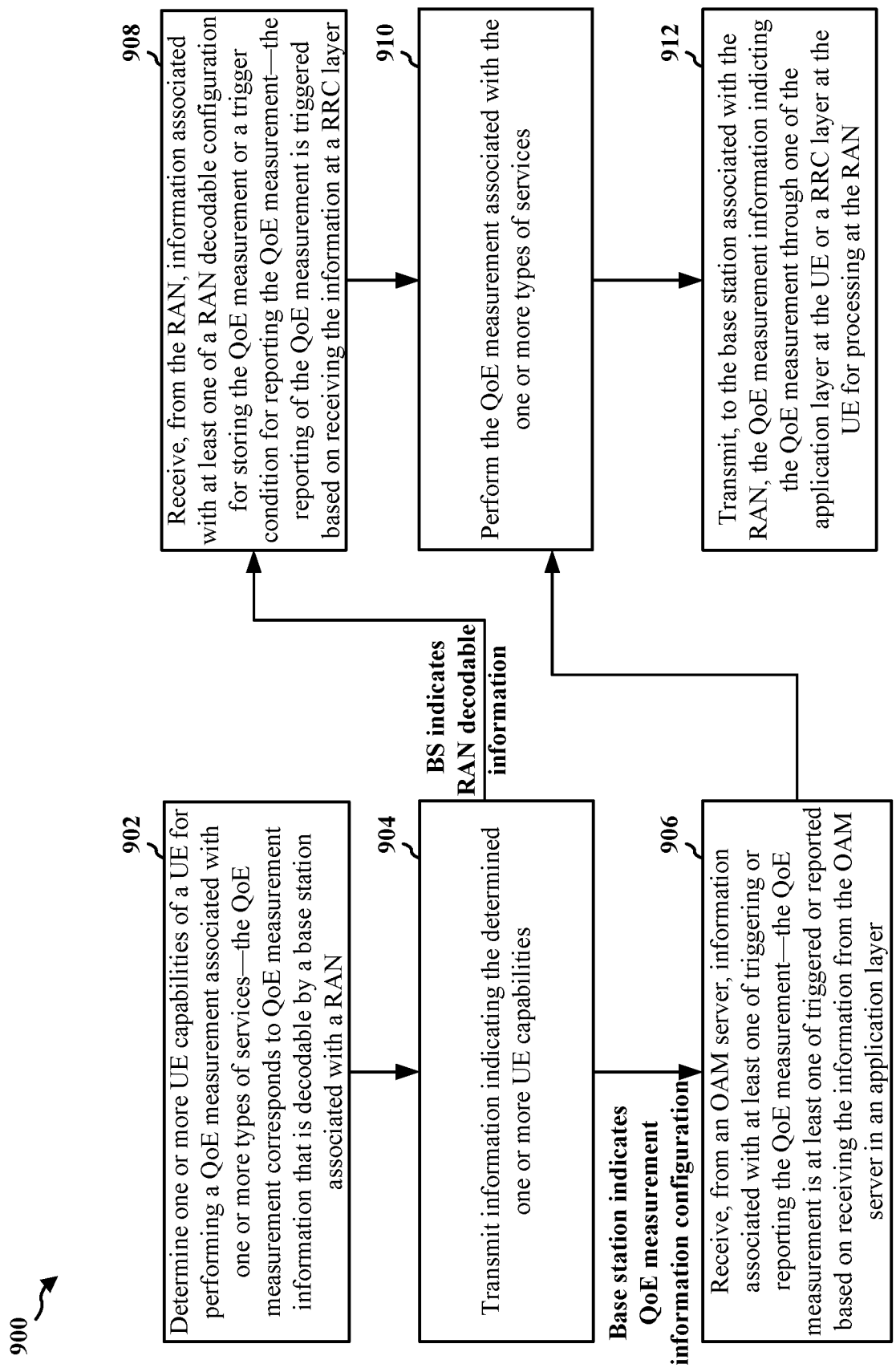
FIG. 9 is a flowchart of a method of wireless communication at a UE.

FIG. 9 is a flowchart 900 of a method of wireless communication. The method may be performed by a UE (e.g., the UE 104/402; the apparatus 1402; etc.), which may include the memory 360 and which may be the entire UE 104/402 or a component of the UE 104/402, such as the TX processor 368, the RX processor 356, and/or the controller/processor 359.

At 902, the UE may determine one or more UE capabilities of a UE for performing a QoE measurement associated with one or more types of services—the QoE measurement corresponds to QoE measurement information that is decodable by a base station associated with a RAN. For example, referring to FIG. 4, the UE 402 may determine, at 406, UE capabilities for QoE measurement for one or more types of services. The QoE measurement performed, at 414, may correspond the QoE measurement information transmitted, at 418, for decoding by the base station 404. The one or more UE capabilities (e.g., determined at 406) may be determined to include one UE capability for each type of service of the one or more types of services, where each UE capability indicates whether the UE 402 can perform the QoE measurement for a corresponding type of service. For example, the UE 402 may determine, at 408(1), QoE measurement capabilities per service type. The determination, at 902, may be performed by the determination component 1442 of the apparatus 1402 in FIG. 14.

The one or more types of services may include a plurality of types of services, and the one or more UE capabilities (e.g., determined at 406) may be determined to include at least one UE capability indicating whether the UE 402 can perform simultaneous QoE measurements for the plurality of types of services. For example, the UE 402 may determine, at 408(2), a simultaneous QoE measurement capability for a plurality of service types. The one or more UE capabilities (e.g., determined at 406) may be determined to include at least one UE capability indicating whether the UE 402 can perform a plurality of QoE measurements for at least one type of service of the one or more types of services. For example, the UE 402 may determine, at 408(3), a QoE measurement capability for multiple instances of a single service type. The one or more types of services may include a plurality of types of services, and the one or more UE capabilities (e.g., determined at 406) may be determined to include at least one UE capability indicating whether the UE 402 can perform simultaneous QoE measurements for the plurality of types of services, and whether the UE 402 can perform a plurality of QoE measurements for each type of service of the plurality of types of services. For example, the UE 402 may determine, at 408(4), a combined UE capability for performing both of 408(2) and 408(3).

The one or more UE capabilities (e.g., determined at 406) may be determined to include at least one UE capability indicating whether the UE 402 can perform the QoE measurement for the one or more types of services while the UE 402 is in at least one of an idle state or an inactive state with respect to each of the one or more types of services. For example, the UE 402 may determine, at 408(5), a QoE measurement capability for RRC idle/inactive states. In a first aspects, the one or more UE capabilities (e.g., determined at 406) may be determined to include one UE capability for each type of service of the one or more types of services, where each UE capability indicates whether the UE 402 can perform the QoE measurement for the corresponding type of service while the UE 402 is in any RRC state with respect to the corresponding type of service. In a second aspect, the one or more UE capabilities (e.g., determined at 406) may be determined to include a plurality of UE capabilities for each type of service of the one or more types of services, such that a first UE capability of the plurality of UE capabilities for each type of service may indicate whether the UE 402 can perform the QoE measurement for the corresponding type of service while the UE 402 is in a RRC connected state with respect to the corresponding type of service, and a second UE capability of the plurality of UE capabilities for each type of service may indicate whether the UE 402 can perform the QoE measurement for the corresponding type of service while the UE 402 is in at least one of an RRC idle state or an RRC inactive state with respect to the corresponding type of service.

At 904, the UE may transmit information indicating the determined one or more UE capabilities. For example, referring to FIG. 4, the UE 402 may transmit, at 410, the determined UE capabilities to the base station 404. The transmission, at 904, may be performed by the transmission component 1434 of the apparatus 1402 in FIG. 14.

At 906, if the base station indicates a QoE measurement information configuration to the UE, the UE may receive, from an OAM server, information associated with at least one of triggering or reporting the QoE measurement—the QoE measurement is at least one of triggered or reported based on receiving the information from the OAM server in an application layer. For example, referring to FIG. 4, the UE 402 may receive, at 412*a*, a QoE measurement information configuration in the application layer. A triggering/reporting condition for the QoE measurement information may be received from an OAM server via the base station 404, and may cause the UE 402 to perform, at 414, the QoE measurement for the one or more types of services and/or report, at 418, QoE measurement information to the base station 404. The information received, at 412*a*, may be associated with a SA4 container for a QoE measurement information configuration. The reception, at 906, may be performed by the reception component 1430 of the apparatus 1402 in FIG. 14.

At 908, if the base station indicates RAN decodable information to the UE, the UE may receive, from the RAN, information associated with at least one of a RAN decodable configuration for storing the QoE measurement or a trigger condition for reporting the QoE measurement—the reporting of the QoE measurement is triggered based on receiving the information at a RRC layer. For example, referring to FIG. 4, the UE 402 may receive, at 412*b* from the base station 404 via the RRC layer, information associated with a RAN decodable configuration for storing a QoE measurement (e.g., performed at 414) and/or a triggering/reporting condition that may cause the UE 402 to report (e.g., at 418) the QoE measurement information to the base station 404. The reception, at 908, may be performed by the reception component 1430 of the apparatus 1402 in FIG. 14.

At 910, the UE may perform the QoE measurement associated with the one or more types of services. For example, referring to FIG. 4, the UE 402 may perform, at 414, the QoE measurement for the one or more types of services. In a first aspect, performing, at 414, the QoE measurement associated with the one or more types of services may be based on performing a first QoE measurement stored, at 416, at the application layer in a first SA4 container reported, at 418, to the RAN/base station 404, and performing a second QoE measurement stored, at 416, at the application layer in a second SA4 container reported to the QoE server via the reporting, at 418, to the base station 404. In a second aspect, performing, at 414, the QoE measurement associated with the one or more types of services may further include at least one of performing the QoE measurement for a plurality of types of services of the one or more types of services (e.g., based on 408(2)), or performing the QoE measurement on a plurality of occasions for one type of service of the one or more service types (e.g., based on 408(3)). In configurations, the QoE measurement information may be stored, at 416, at the RRC layer. The at least one of the QoE measurement performed (e.g., at 414) for the plurality of types of services or the QoE measurement performed (e.g., at 414) on the plurality of occasions for the one type of service may be based on at least one of a trace ID or a reference ID. The performance, at 910, may be performed by the performance component 1444 of the apparatus 1402 in FIG. 14.

At 912, the UE may transmit, to the base station associated with the RAN, the QoE measurement information indicting the QoE measurement through one of the application layer at the UE or a RRC layer at the UE for processing at the RAN. For example, referring to FIG. 4, the UE 402 may transmit/report, at 418, QoE measurement information to the RAN/base station 404 via the application layer of the RRC layer. The QoE measurement information transmitted/reported, at 418, may be indicative of the QoE measurement performed, at 414, for the one or more types of services, and may be configured for processing at the RAN/base station 404. The transmission, at 912, may be performed by the transmission component 1434 of the apparatus 1402 in FIG. 14.

Figure 10:
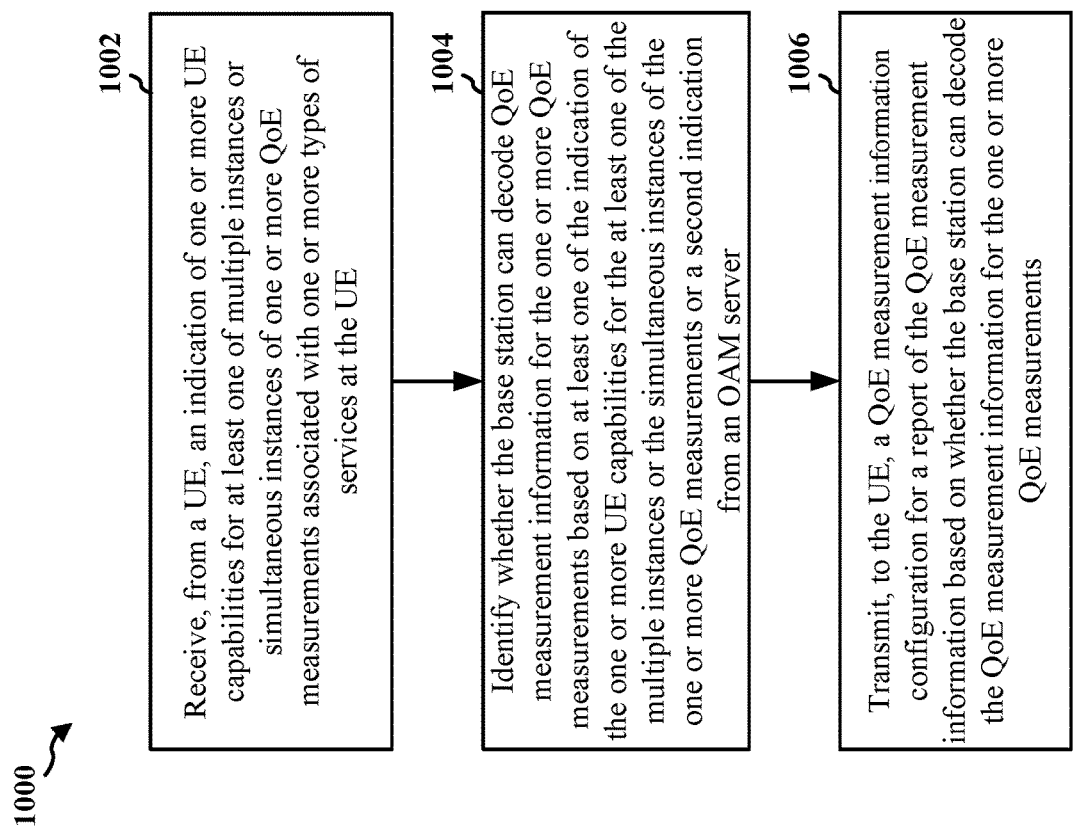
FIG. 10 is a flowchart of a method of wireless communication at a base station.

FIG. 10 is a flowchart 1000 of a method of wireless communication. The method may be performed by a base station (e.g., the base station 102/404; the apparatus 1502; etc.), which may include the memory 376 and which may be the entire base station 102/404 or a component of the base station 102/404, such as the TX processor 316, the RX processor 370, and/or the controller/processor 375.

At 1002, the base station may receive, from a UE, an indication of one or more UE capabilities for at least one of multiple instances or simultaneous instances of one or more QoE measurements associated with one or more types of services at the UE. For example, referring to FIG. 4, the base station 404 may receive, at 410, determined UE capabilities from the UE 402 for a QoE measurement for one or more types of services. The reception, at 1002, may be performed by the reception component 1530 of the apparatus 1502 in FIG. 15.

At 1004, the base station may identify whether the base station can decode QoE measurement information for the one or more QoE measurements based on at least one of the indication of the one or more UE capabilities for the at least one of the multiple instances or the simultaneous instances of the one or more QoE measurements or a second indication from an OAM server. For example, referring to FIG. 4, the base station 404 may indicate, at 412*b*, RAN decode parameters to the UE 402 via the RRC layer based on the UE capabilities indicated, at 410, from the UE 402 and/or an indication received from an OAM. The identifying, at 1004, may be performed by the identification component 1540 of the apparatus 1502 in FIG. 15.

At 1006, the base station may transmit, to the UE, a QoE measurement information configuration for a report of the QoE measurement information based on whether the base station can decode the QoE measurement information for the one or more QoE measurements. For example, referring to FIG. 4, the base station 404 may transmit, at 412*a*, QoE measurement information configuration to the UE 402 based on the UE capabilities indicated, at 410, from the UE 402 and/or the indication received from the OAM. The transmission, at 1006, may be performed by the transmission component 1534 of the apparatus 1502 in FIG. 15.

Figure 11:
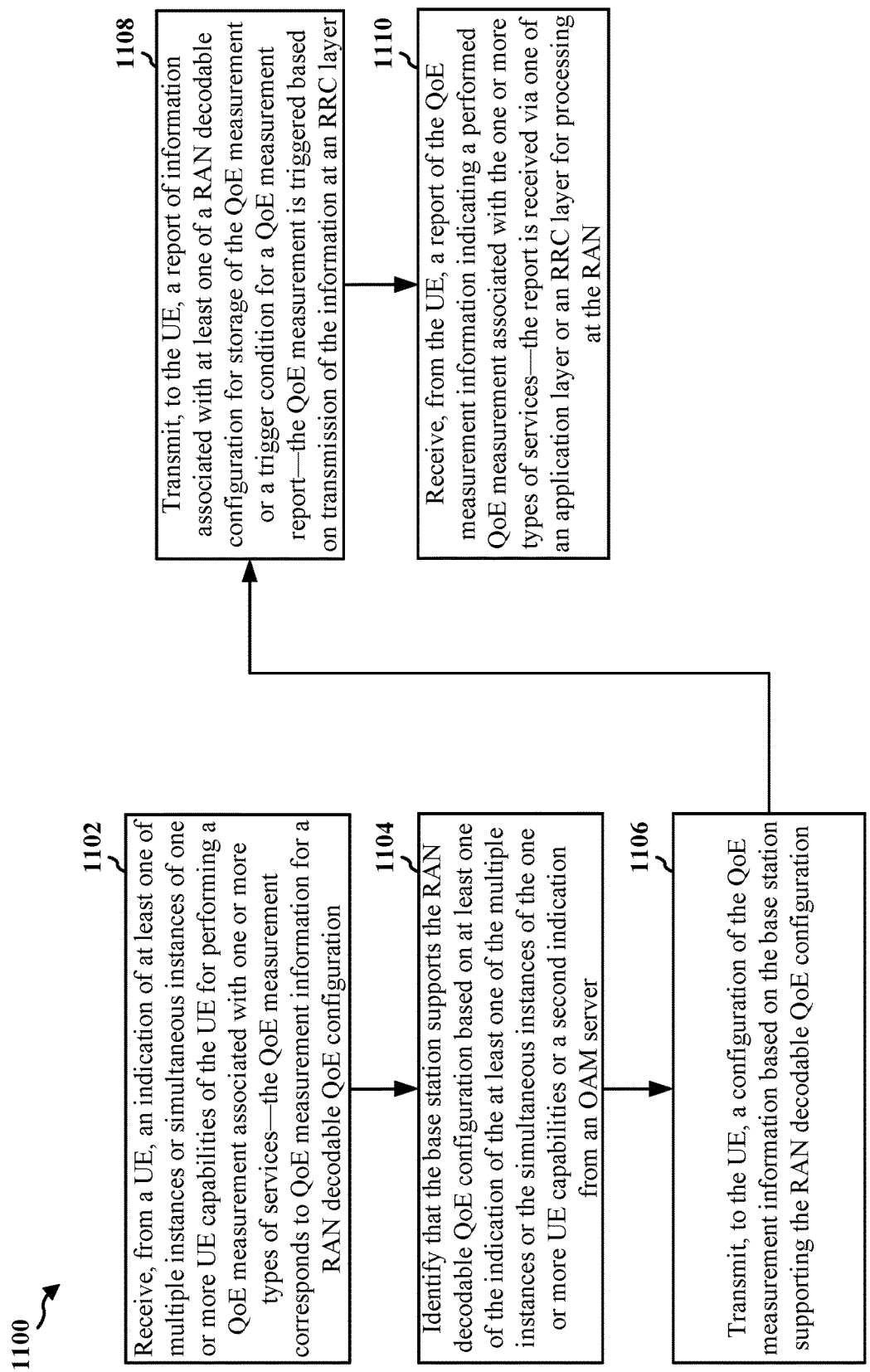
FIG. 11 is a flowchart of a method of wireless communication at a base station.

FIG. 11 is a flowchart 1100 of a method of wireless communication. The method may be performed by a base station (e.g., the base station 102/404; the apparatus 1502; etc.), which may include the memory 376 and which may be the entire base station 102/404 or a component of the base station 102/404, such as the TX processor 316, the RX processor 370, and/or the controller/processor 375.

At 1102, the base station may receive, from a UE, an indication of at least one of multiple instances or simultaneous instances of one or more UE capabilities of the UE for performing a QoE measurement associated with one or more types of services—the QoE measurement corresponds to QoE measurement information for a RAN decodable QoE configuration. For example, referring to FIG. 4, the base station 404 may receive, at 410, determined UE capabilities from the UE 402 for a QoE measurement for one or more types of services. The reception, at 1102, may be performed by the reception component 1530 of the apparatus 1502 in FIG. 15.

The one or more types of services (e.g., associated with the UE capabilities indicated at 410) may include a plurality of types of services, and the one or more UE capabilities (e.g., indicated at 410) may include at least one UE capability indicating whether the UE can perform simultaneous QoE measurements for the plurality of types of services. The one or more UE capabilities indicated, at 410, may include at least one UE capability indicating whether the UE 402 can perform a plurality of QoE measurements for at least one type of service of the one or more types of services. The one or more UE capabilities indicated, at 410, may include at least one UE capability indicating whether the UE 402 can perform the QoE measurement for the one or more types of services while the UE 402 is in at least one of an idle state or an inactive state with respect to each of the one or more types of services. The one or more UE capabilities indicated, at 410, may include one UE capability for each type of service of the one or more types of services, where each UE capability indicates whether the UE 402 can perform the QoE measurement for a corresponding type of service while the UE 402 is in an RRC state with respect to the corresponding type of service. The one or more UE capabilities indicated, at 410, may include a plurality of UE capabilities for each type of service of the one or more types of services, where a first UE capability of the plurality of UE capabilities for each type of service indicates whether the UE 402 can perform the QoE measurement for a corresponding type of service while the UE 402 is in an RRC connected state with respect to the corresponding type of service, and a second UE capability of the plurality of UE capabilities for each type of service indicates whether the UE 402 can perform the QoE measurement for the corresponding type of service while the UE 402 is in at least one of an RRC idle or an RRC inactive state with respect to the corresponding type of service.

At 1104, the base station may identify that the base station supports the RAN decodable QoE configuration based on at least one of the indication of the at least one of the multiple instances or the simultaneous instances of the one or more UE capabilities or a second indication from an OAM server. For example, referring to FIG. 4, the base station 404 may indicate, at 412*b*, RAN decode parameters to the UE 402 via the RRC layer based on the UE capabilities indicated, at 410, from the UE 402 and/or an indication received from an OAM. The identifying, at 1104, may be performed by the identification component 1540 of the apparatus 1502 in FIG. 15.

At 1106, the base station may transmit, to the UE, a configuration of the QoE measurement information based on the base station supporting the RAN decodable QoE configuration. For example, referring to FIG. 4, the base station 404 may transmit, at 412*a*, a QoE measurement information configuration to the UE 402 based on the UE capabilities indicated, at 410, from the UE 402 and/or the indication received from the OAM. The transmission, at 1106, may be performed by the transmission component 1534 of the apparatus 1502 in FIG. 15.

At 1108, the base station may transmit, to the UE, a report of information associated with at least one of a RAN decodable configuration for storage of the QoE measurement or a trigger condition for a QoE measurement report—the QoE measurement is triggered based on transmission of the information at an RRC layer. For example, referring to FIG. 4, the base station 404 may transmit, at 412*b*, a RAN decodable parameter configuration and/or a triggering/reporting condition to the UE 402 via the RRC layer. The transmission, at 1108, may be performed by the transmission component 1534 of the apparatus 1502 in FIG. 15.

At 1110, the base station may receive, from the UE, a report of the QoE measurement information indicating a performed QoE measurement associated with the one or more types of services—the report is received via one of an application layer or an RRC layer for processing at the RAN. For example, referring to FIG. 4, the base station 404 may receive, at 418, QoE measurement information from the UE 402 via an application layer or an RRC layer. The performed QoE measurement associated with the one or more types of services may be based on a first QoE measurement stored at the application layer in a first application layer container reported to the RAN (e.g., base station 404) and a second QoE measurement stored at the application layer in a second application layer container reported to a QoE server (e.g., from the base station 404). The performed QoE measurement associated with the one or more types of services may further include at least one of a first performed QoE measurement for a plurality of types of services of the one or more types of services, or a second performed QoE measurement on a plurality of occasions for one type of service of the one or more types of services, where the QoE measurement information received, at 418, may be stored at the RRC layer. The at least one of the first performed QoE measurement for the plurality of types of services or the second performed QoE measurement on the plurality of occasions for the one type of service may be based on at least one of a trace ID or a reference ID. The reception, at 1110, may be performed by the reception component 1530 of the apparatus 1502 in FIG. 15.

Figure 12:
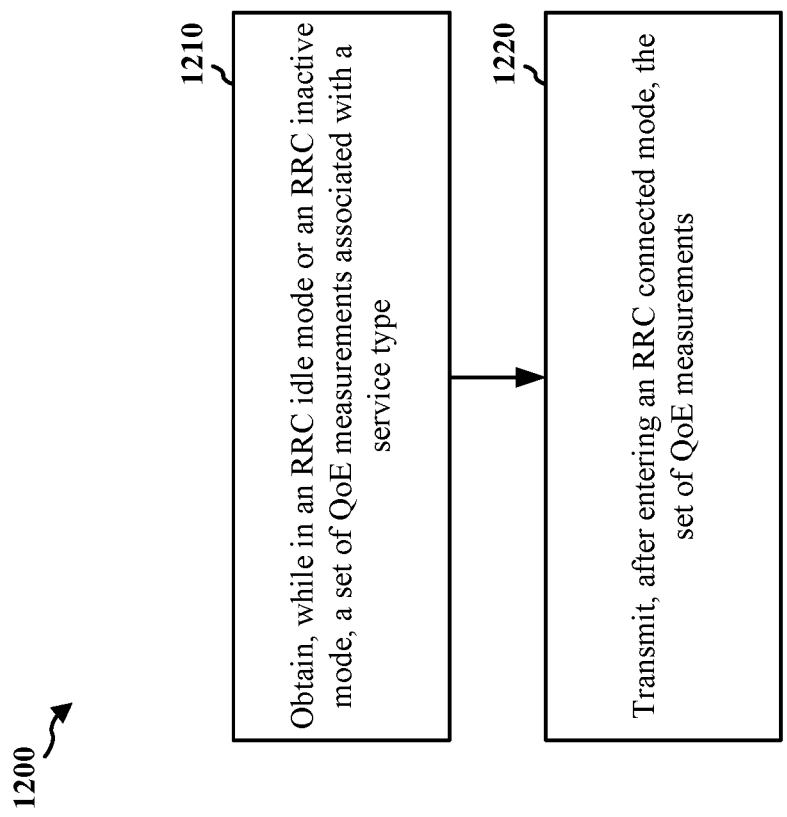
FIG. 12 is a flowchart of a method of wireless communication at a UE.

FIG. 12 is a diagram illustrating an example process 1200 performed, for example, by a UE, in accordance with various aspects of the present disclosure. Example process 1200 is an example where the UE (e.g., UE 104) performs operations associated with QoE reporting in RRC modes.

As shown in FIG. 12, in some aspects, process 1200 may include obtaining, while in an RRC idle mode or an RRC inactive mode, a set of QoE measurements associated with a service type (block 1210). For example, the UE (e.g., using obtainer component 1446 of the communication manager 1432 and/or reception component 1430, depicted in FIG. 14) may obtain, while in an RRC idle mode or an RRC inactive mode, a set of QoE measurements associated with a service type, as described above.

As further shown in FIG. 12, in some aspects, process 1200 may include transmitting, after entering an RRC connected mode, the set of QoE measurements (block 1220). For example, the UE (e.g., using transmission component 1434, depicted in FIG. 14) may transmit, after entering an RRC connected mode, the set of QoE measurements, as described above.

Process 1200 may include additional aspects, such as any single aspect or any combination of aspects described below and/or in connection with one or more other processes described elsewhere herein.

In a first aspect, process 1200 includes storing the QoE measurements based at least in part on the UE being in the RRC idle mode or the RRC inactive mode.

In a second aspect, alone or in combination with the first aspect, process 1200 includes providing, from an access stratum layer of the UE to an application layer of the UE associated with the service type, an indication for the application layer to stop sending QoE measurements to the access stratum layer of the UE.

In a third aspect, alone or in combination with one or more of the first and second aspects, providing the indication to stop sending QoE measurements to the access stratum layer of the UE is based at least in part on the UE entering the RRC idle mode or the RRC inactive mode.

In a fourth aspect, alone or in combination with one or more of the first through third aspects, process 1200 includes providing, from an access stratum layer of the UE to an application layer of the UE associated with the service type, an indication to resume sending QoE measurements to the access stratum layer of the UE.

In a fifth aspect, alone or in combination with one or more of the first through fourth aspects, providing the indication to resume sending QoE measurements to the access stratum layer of the UE is based at least in part on the UE entering the RRC connected mode.

In a sixth aspect, alone or in combination with one or more of the first through fifth aspects, process 1200 includes entering the RRC idle mode or the RRC inactive mode based at least in part on the UE receiving, from a base station, an RRC release, where the RRC release indicates that the UE is to continue obtaining QoE measurements while in the RRC idle mode or the RRC inactive mode.

In a seventh aspect, alone or in combination with one or more of the first through sixth aspects, the RRC release indicates that the UE is to continue obtaining QoE measurements while in the RRC idle mode or the RRC inactive mode based at least in part on the UE remaining in a current tracking area or a current radio access network-based notification area.

In an eighth aspect, alone or in combination with one or more of the first through seventh aspects, process 1200 includes providing, from an access stratum layer of the UE to an application layer of the UE associated with the service type, an indication to stop sending QoE measurements to the access stratum layer of the UE, and providing, from the access stratum layer of the UE to the application layer of the UE associated with the service type, an indication to resume sending QoE measurements to the access stratum layer of the UE based at least in part on the UE performing a cell reselection process.

In a ninth aspect, alone or in combination with one or more of the first through eighth aspects, the RRC release indicates that the UE is to continue obtaining QoE measurements while in the RRC idle mode or the RRC inactive mode based at least in part on the UE remaining in a set of tracking areas or a set of radio access network-based notification areas.

In a tenth aspect, alone or in combination with one or more of the first through ninth aspects, process 1200 includes providing, from an access stratum layer of the UE to an application layer of the UE associated with the service type, an indication to stop sending QoE measurements to the access stratum layer of the UE, and providing, from the access stratum layer of the UE to the application layer of the UE associated with the service type, an indication to resume sending QoE measurements to the access stratum layer of the UE based at least in part on the UE determining that a reselected cell is not in the set of tracking areas or the set of radio access network-based notification areas.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
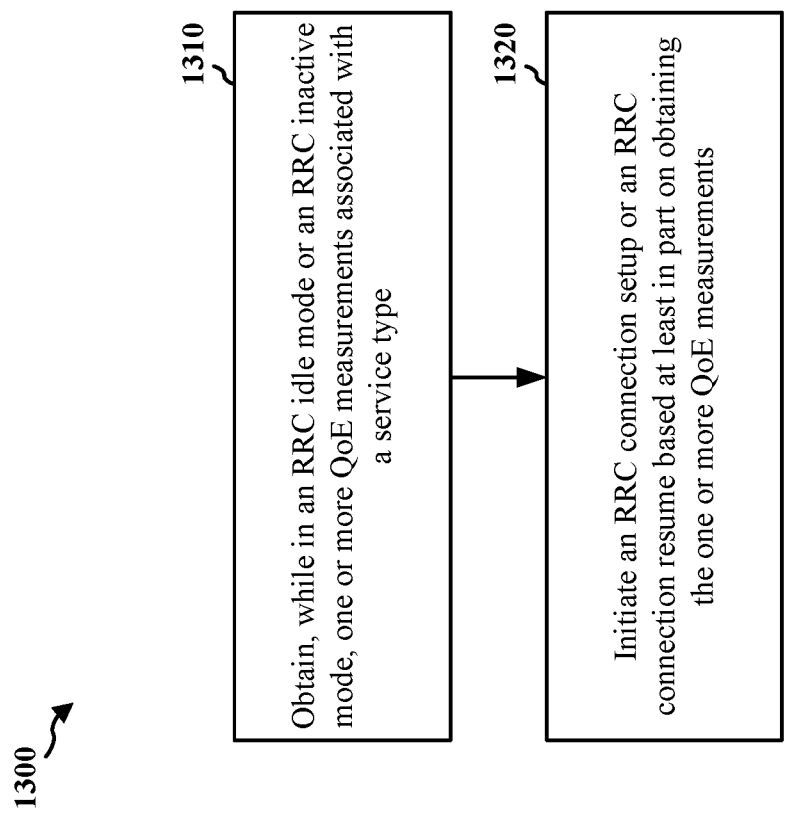
FIG. 13 is a flowchart of a method of wireless communication at a UE.

FIG. 13 is a diagram illustrating an example process 1300 performed, for example, by an UE, in accordance with various aspects of the present disclosure. Example process 1300 is an example where the UE (e.g., UE 104) performs operations associated with quality of experience reporting in radio resource control modes.

As shown in FIG. 13, in some aspects, process 1300 may include obtaining, while in an RRC idle mode or an RRC inactive mode, one or more QoE measurements associated with a service type (block 1310). For example, the UE (e.g., using the obtainer component 1446 of the communication manager 1432 and/or the reception component 1430, depicted in FIG. 14) may obtain, while in an RRC idle mode or an RRC inactive mode, one or more QoE measurements associated with a service type, as described above.

As further shown in FIG. 13, in some aspects, process 1300 may include initiating an RRC connection setup or an RRC connection resume based at least in part on obtaining the one or more QoE measurements (block 1320). For example, the UE (e.g., using initiation component 1448 of the communication manager 1432 and/or the transmission component 1434, depicted in FIG. 14) may initiate an RRC connection setup or an RRC connection resume based at least in part on obtaining the one or more QoE measurements, as described above.

Process 1300 may include additional aspects, such as any single aspect or any combination of aspects described below and/or in connection with one or more other processes described elsewhere herein.

In a first aspect, process 1300 includes entering the RRC idle mode or the RRC inactive mode based at least in part on the UE receiving, from a base station, an RRC release, where the RRC release indicates that the UE is to initiate the RRC connection setup or the RRC connection resume based at least in part on the UE obtaining the one or more QoE measurements.

In a second aspect, alone or in combination with the first aspect, the RRC release indicates that the UE is to initiate the RRC connection setup or the RRC connection resume based at least in part on the UE obtaining the one or more QoE measurements and based at least in part on the UE remaining in a current tracking area or a current radio access network-based notification area.

In a third aspect, alone or in combination with one or more of the first and second aspects, the RRC release indicates that the UE is to initiate the RRC connection setup or the RRC connection resume based at least in part on the UE obtaining the one or more QoE measurements and based at least in part on the UE remaining in a set of tracking areas or a set of radio access network-based notification areas.

In a fourth aspect, alone or in combination with one or more of the first through third aspects, initiating the RRC connection setup or the RRC connection resume is based at least in part on a number of the one or more QoE measurements satisfying a QoE measurements threshold.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
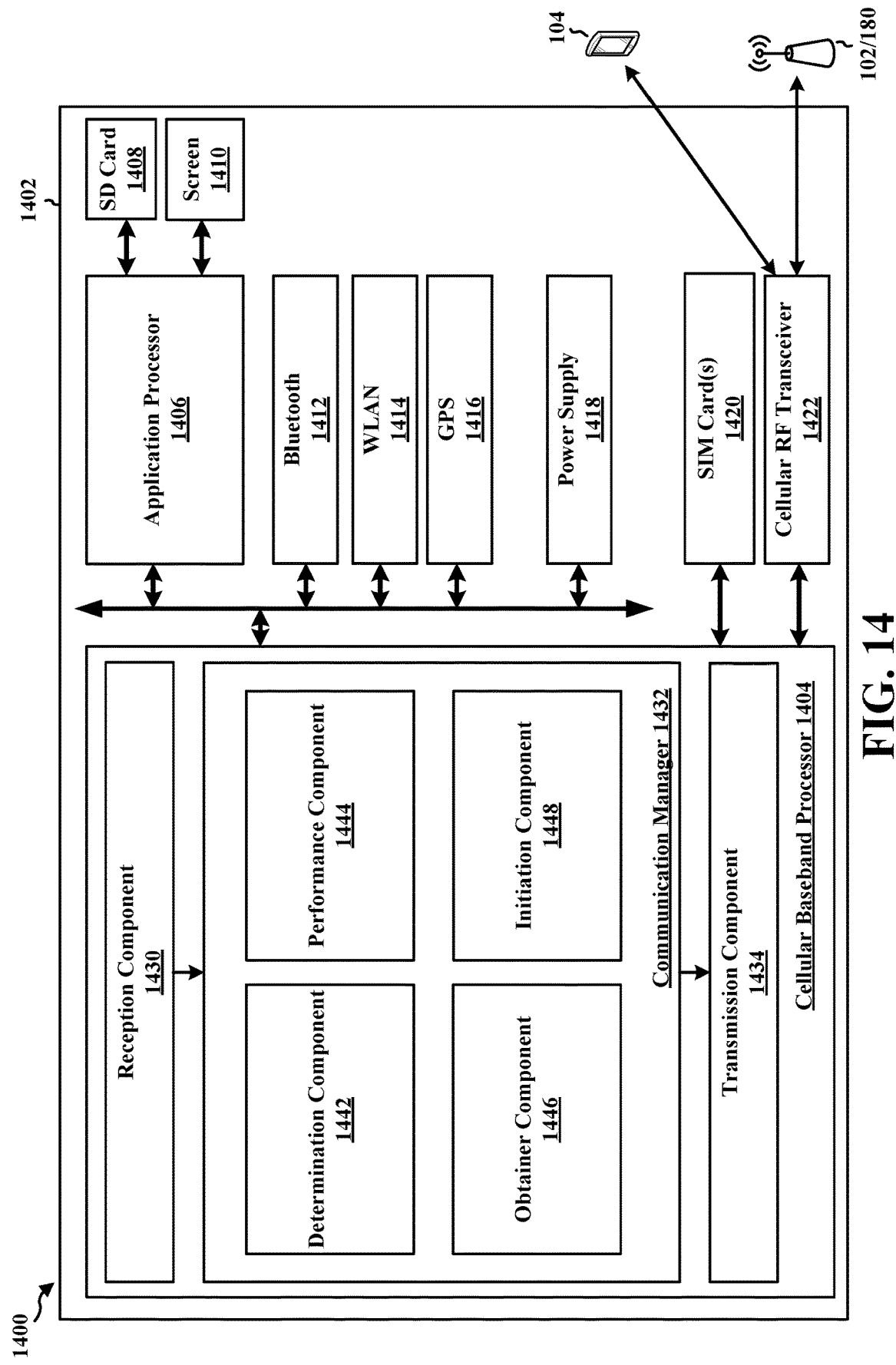
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the above-discussed additional modules of the apparatus 1402.

In association with the flowchart 800, the transmission component 1434 is configured, e.g., as described in connection with 804, to transmit, to a base station, an indication of one or more UE capabilities for least one of multiple instances or simultaneous instances of one or more QoE measurements associated with one or more types of services. The reception component 1430 is configured, e.g., as described in connection with 806, to receive, from the base station, a QoE measurement information configuration for reporting QoE measurement information associated the with one or more types of services based on the indication of the one or more UE capabilities for the at least one of the multiple instances or the simultaneous instances of the one or more QoE measurements.

In association with the flowchart 900, the communication manager 1432 includes a determination component 1442 that is configured, e.g., as described in connection with 902, to determine one or more UE capabilities of a UE for performing a QoE measurement associated with one or more types of services—the QoE measurement corresponds to QoE measurement information that is decodable by a base station associated with a RAN. The communication manager 1432 further includes a performance component 1444 that is configured, e.g., as described in connection with 910, to perform the QoE measurement associated with the one or more types of services. The transmission component 1434 is configured, e.g., as described in connection with 904 and 912, to transmit information indicating the determined one or more UE capabilities; and to transmit, to the base station associated with the RAN, the QoE measurement information indicting the QoE measurement through one of the application layer at the UE or a RRC layer at the UE for processing at the RAN. The reception component 1434 is configured, e.g., as described in connection with 906 and 908, to receive, from an OAM server, information associated with at least one of triggering or reporting the QoE measurement—the QoE measurement is at least one of triggered or reported based on receiving the information from the OAM server in an application layer; and to receive, from the RAN, information associated with at least one of a RAN decodable configuration for storing the QoE measurement or a trigger condition for reporting the QoE measurement—the reporting of the QoE measurement is triggered based on receiving the information at a RRC layer.

In association with the process 1200, the communication manager 1432 includes an obtainer component 1446 that is configured, e.g., as described in connection with 1210, to obtain, while in an RRC idle mode or an RRC inactive mode, a set of QoE measurements associated with a service type. The transmission component 1434 is configured, e.g., as described in connection with 1220, to transmit, after entering an RRC connected mode, the set of QoE measurements.

In association with the process 1300, the communication manager 1432 includes an obtainer component 1446 that is configured, e.g., as described in connection with 1310, to obtain, while in an RRC idle mode or an RRC inactive mode, one or more QoE measurements associated with a service type. The communication manager 1432 further includes an initiation component 1448 that is configured, e.g., as described in connection with 1320, to initiate an RRC connection setup or an RRC connection resume based at least in part on obtaining the one or more QoE measurements.

The apparatus may include additional components that perform each of the blocks of the algorithm in the aforementioned flowcharts of FIGS. 8-9 and 12-13. As such, each block in the aforementioned flowcharts of FIGS. 8-9 and 12-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus 1402, and in particular the cellular baseband processor 1404, includes means for transmitting, to a base station, an indication of one or more UE capabilities for at least one of multiple instances or simultaneous instances of one or more QoE measurements associated with one or more types of services; and means for receiving, from the base station, a QoE measurement information configuration for reporting QoE measurement information associated with the one or more types of services based on the indication of the one or more UE capabilities for the at least one of the multiple instances or the simultaneous instances of the one or more QoE measurements.

The apparatus 1402, and in particular the cellular baseband processor 1404, includes means for determining one or more UE capabilities of the UE for performing a QoE measurement associated with one or more types of services, the QoE measurement corresponding to QoE measurement information that is decodable by a base station associated with a RAN; and means for transmitting information indicating the determined one or more UE capabilities. The apparatus 1402 further includes means for performing the QoE measurement associated with the one or more types of services; and means for transmitting, to the base station associated with the RAN, the QoE measurement information indicting the QoE measurement through one of an application layer at the UE or a RRC layer at the UE for processing at the RAN. The apparatus 1402 further includes means for receiving, from an OAM server, information associated with at least one of triggering or reporting the QoE measurement, where the QoE measurement is at least one of triggered or reported based on receiving the information from the OAM server in the application layer, the information associated with a SA4 container for a QoE configuration. The means for performing the QoE measurement associated with the one or more types of services may be further configured to perform a first QoE measurement stored at the application layer in a first SA4 container for reporting to the RAN and perform a second QoE measurement stored at the application layer in a second SA4 container for reporting to the QoE server. The apparatus 1402 further includes means for receiving, from the RAN, information associated with at least one of a RAN decodable configuration for storing the QoE measurement or a trigger condition for reporting the QoE measurement, where reporting the QoE measurement is triggered based on receiving the information at a RRC layer. The means for performing the QoE measurement associated with the one or more types of services may be further configured to at least one of perform the QoE measurement for a plurality of types of services of the one or more types of services, or perform the QoE measurement on a plurality of occasions for one type of service of the one or more service types, the QoE measurement information stored at the RRC layer.

The apparatus 1402, and in particular the cellular baseband processor 1404, includes means for obtaining, in association with a UE capabilities indication that the UE supports the QoE measurements while in an RRC idle mode or an RRC inactive mode, a set of QoE measurements associated with a service type; and means for transmitting the obtained set of QoE measurements in the RRC idle mode or the RRC active mode, after entering an RRC connected mode, the set of QoE measurements. The apparatus 1402 further includes means for storing the QoE measurements based at least in part on the UE being in the RRC idle mode or the RRC inactive mode. The apparatus 1402 further includes means for providing, from an access stratum layer of the UE to an application layer of the UE associated with the service type, an indication for the application layer to stop sending QoE measurements to the access stratum layer of the UE. The apparatus 1402 further includes means for providing, from an access stratum layer of the UE to an application layer of the UE associated with the service type, an indication to resume sending QoE measurements to the access stratum layer of the UE. The apparatus 1402 further includes means for entering the RRC idle mode or the RRC inactive mode based at least in part on the UE receiving, from a base station, an RRC release, where the RRC release indicates that the UE is to continue obtaining QoE measurements while in the RRC idle mode or the RRC inactive mode. The apparatus 1402 further includes means for providing, from an access stratum layer of the UE to an application layer of the UE associated with the service type, an indication to stop sending QoE measurements to the access stratum layer of the UE; and means for providing, from the access stratum layer of the UE to the application layer of the UE associated with the service type, an indication to resume sending QoE measurements to the access stratum layer of the UE based at least in part on the UE performing a cell reselection process. The apparatus 1402 further includes means for providing, from an access stratum layer of the UE to an application layer of the UE associated with the service type, an indication to stop sending QoE measurements to the access stratum layer of the UE; and means for providing, from the access stratum layer of the UE to the application layer of the UE associated with the service type, an indication to resume sending QoE measurements to the access stratum layer of the UE based at least in part on the UE determining that a reselected cell is not in the set of tracking areas or the set of radio access network-based notification areas.

The apparatus 1402, and in particular the cellular baseband processor 1404, includes means for obtaining, in association with a UE capabilities indication that the UE supports the QoE measurements while in an RRC idle mode or an RRC inactive mode, one or more QoE measurements associated with a service type; and means for initiating an RRC connection setup or an RRC connection resume based at least in part on obtaining the one or more QoE measurements. The apparatus 1402 further includes means for entering the RRC idle mode or the RRC inactive mode based at least in part on the UE receiving, from a base station, an RRC release, where the RRC release indicates that the UE is to initiate the RRC connection setup or the RRC connection resume based at least in part on the UE obtaining the one or more QoE measurements.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
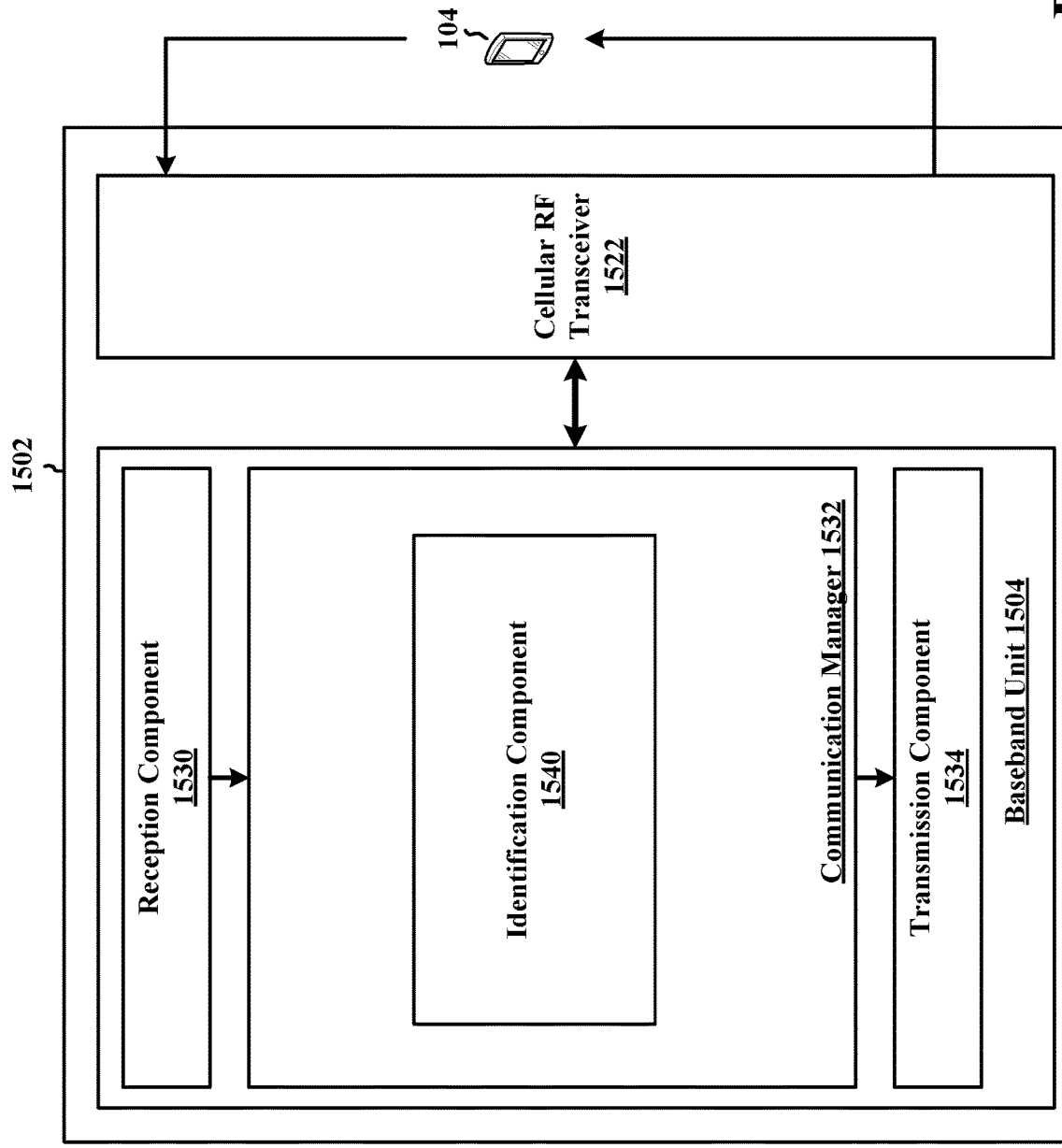
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes an identification component 1540 that is configured, e.g., as described in connection with 1004 and 1104, to identify whether the base station can decode QoE measurement information for the one or more QoE measurements based on at least one of the indication of the one or more UE capabilities for the at least one of the multiple instances or the simultaneous instances of the one or more QoE measurements or a second indication from an OAM server. The reception component 1530 is configured, e.g., as descried in connection with 1002, 1102, and 1110, to receive, from a UE, an indication of one or more UE capabilities for at least one of multiple instances or simultaneous instances of one or more QoE measurement associated with one or more types of services at the UE; and to receive, from the UE, a report of the QoE measurement information indicating a performed QoE measurement associated with the one or more types of services—the report is received via one of an application layer or an RRC layer for processing at the RAN. The transmission component 1534 is configured, e.g., as described in connection with 1006, 1106, and 1108, to transmit, to the UE, a QoE measurement information configuration for a report of the QoE measurement information based on identifying that the base station can decode QoE measurement information for the one or more QoE measurements; and to transmit, to the UE, a report of information associated with at least one of a RAN decodable configuration for storage of the QoE measurement or a trigger condition for a QoE measurement report—the QoE measurement is triggered based on transmission of the information at an RRC layer.

The apparatus may include additional components that perform each of the blocks of the algorithm in the flowcharts of FIGS. 10-11. As such, each block in the flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving, from a UE, an indication of one or more UE capabilities for at least one of multiple instances or simultaneous instances of one or more QoE measurements associated with one or more types of services at the UE; means for identifying whether the base station can decode QoE measurement information for the one or more QoE measurements based on at least one of the indication of the one or more UE capabilities for the at least one of the multiple instances or the simultaneous instances of the one or more QoE measurements or a second indication from an OAM server; and means for transmitting, to the UE, a QoE measurement information configuration for a report of the QoE measurement information based on whether the base station can decode the QoE measurement information for the one or more QoE measurements. The apparatus 1502 further includes means for receiving from the UE, a report of the QoE measurement information indicating a performed QoE measurement associated with the one or more types of services, and where the report is received via one of an application layer or an RRC layer for processing at the RAN. The apparatus 1502 further includes means for transmitting to the UE, a second report of information associated with at least one of a RAN decodable configuration for storage of the QoE measurement or a trigger condition for a QoE measurement report, and where the QoE measurement is triggered based on transmission of the information at an RRC layer.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

Accordingly, the UE may determine a capability of the UE for performing QoE measurements, and may indicate such capabilities to the RAN prior to performing the QoE measurements and reporting the QoE measurement information to the RAN. The UE may be configured with QoE measurements triggering/reporting information, and/or configured to report RAN decodable parameters to the RAN. The RAN decodable parameters may be decoded at the RAN for increasing the performance of the RAN. For example, an adjustment to a reported QoE measurement parameter decoded at the RAN may increase the performance of the RAN.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to transmit, to a base station, an indication of one or more UE capabilities for at least one of multiple instances or simultaneous instances of one or more QoE measurements associated with one or more types of services; and receive, from the base station, a QoE measurement information configuration for reporting QoE measurement information associated with the one or more types of services based on the indication of the one or more UE capabilities for the at least one of the multiple instances or the simultaneous instances of the one or more QoE measurements.

Aspect 2 may be combined with aspect 1 and includes that the one or more types of services include a plurality of types of services, and the one or more UE capabilities includes at least one UE capability indicating whether the UE can perform simultaneous QoE measurements for the plurality of types of services.

Aspect 3 may be combined with any of aspects 1-2 and includes that the one or more UE capabilities includes at least one UE capability indicating whether the UE can perform a plurality of QoE measurements for at least one type of service of the one or more types of services.

Aspect 4 may be combined with any of aspects 1-3 and includes that the one or more UE capabilities includes at least one UE capability indicating whether the UE can perform the one or more QoE measurements for the one or more types of services while the UE is in at least one of an idle state or an inactive state with respect to each of the one or more types of services.

Aspect 5 may be combined with any of aspects 1-4 and includes that the one or more UE capabilities includes one UE capability for each type of service of the one or more types of services, each UE capability indicating whether the UE can perform the one or more QoE measurements for a corresponding type of service while the UE is in an RRC state with respect to the corresponding type of service.

Aspect 6 may be combined with any of aspects 1-5 and includes that the one or more UE capabilities includes a plurality of UE capabilities for each type of service of the one or more types of services, a first UE capability of the plurality of UE capabilities for each type of service indicating whether the UE can perform the one or more QoE measurements for a corresponding type of service while the UE is in an RRC connected state with respect to the corresponding type of service, a second UE capability of the plurality of UE capabilities for each type of service indicating whether the UE can perform the one or more QoE measurements for the corresponding type of service while the UE is in at least one of an RRC idle or an RRC inactive state with respect to the corresponding type of service.

Aspect 7 may be combined with any of aspects 1-6 and includes that the at least one processor is further configured to: perform the one or more QoE measurements associated with the one or more types of services; and transmit, to the base station, a report of the QoE measurement information indicating the performed one or more QoE measurements, where the report is transmitted via one of an application layer at the UE or an RRC layer at the UE for processing at a RAN.

Aspect 8 may be combined with any of aspects 1-7 and includes that performance of the one or more QoE measurements associated with the one or more types of services is based on performing a first QoE measurement stored at the application layer in a first application layer container for reporting to the RAN and performing a second QoE measurement stored at the application layer in a second application layer container for reporting to a QoE server.

Aspect 9 may be combined with any of aspects 1-7 and includes that the at least one processor is further configured to receive, from the RAN, a second report of information associated with at least one of a RAN decodable configuration for storing the one or more QoE measurements or a trigger condition for reporting the one or more QoE measurements, and where the report of the QoE measurement information is triggered based on receiving the second report of information at the RRC layer.

Aspect 10 may be combined with any of aspects 1-7 or 9 and includes that to perform the one or more QoE measurements associated with the one or more types of services the at least one processor is further configured to at least one of perform the one or more QoE measurements for a plurality of types of services of the one or more types of services, or perform the one or more QoE measurements on a plurality of occasions for one type of service of the one or more types of services, where the QoE measurement information is stored at the RRC layer.

Aspect 11 may be combined with any of aspects 1-7 or 9-10 and includes that the at least one of the one or more QoE measurements performed for the plurality of types of services or the one or more QoE measurements performed on the plurality of occasions for the one type of service is based on at least one of a trace ID or a reference ID.

Aspect 12 is an apparatus for wireless communication at a base station including at least one processor coupled to a memory and configured to receive, from a UE, an indication of one or more UE capabilities for at least one of multiple instances or simultaneous instances of one or more QoE measurements associated with one or more types of services at the UE; identify whether the base station can decode QoE measurement information for the one or more QoE measurements based on at least one of the indication of the one or more UE capabilities for the at least one of the multiple instances or the simultaneous instances of the one or more QoE measurements or a second indication from an OAM server; and transmit, to the UE, a QoE measurement information configuration for a report of the QoE measurement information based on whether the base station can decode the QoE measurement information for the one or more QoE measurements.

Aspect 13 may be combined with aspect 12 and includes that the one or more types of services include a plurality of types of services, and the one or more UE capabilities includes at least one UE capability indicating whether the UE can perform simultaneous QoE measurements for the plurality of types of services.

Aspect 14 may be combined with any of aspects 12-13 and includes that the one or more UE capabilities includes at least one UE capability indicating whether the UE can perform a plurality of QoE measurements for at least one type of service of the one or more types of services.

Aspect 15 may be combined with any of aspects 12-14 and includes that the one or more UE capabilities includes at least one UE capability indicating whether the UE can perform the one or more QoE measurements for the one or more types of services while the UE is in at least one of an idle state or an inactive state with respect to each of the one or more types of services.

Aspect 16 may be combined with any of aspects 12-15 and includes that the one or more UE capabilities includes one UE capability for each type of service of the one or more types of services, each UE capability indicating whether the UE can perform the one or more QoE measurements for a corresponding type of service while the UE is in an RRC state with respect to the corresponding type of service.

Aspect 17 may be combined with any of aspects 12-16 and includes that the one or more UE capabilities includes a plurality of UE capabilities for each type of service of the one or more types of services, a first UE capability of the plurality of UE capabilities for each type of service indicating whether the UE can perform the one or more QoE measurements for a corresponding type of service while the UE is in an RRC connected state with respect to the corresponding type of service, a second UE capability of the plurality of UE capabilities for each type of service indicating whether the UE can perform the one or more QoE measurements for the corresponding type of service while the UE is in at least one of an RRC idle or an RRC inactive state with respect to the corresponding type of service.

Aspect 18 may be combined with any of aspects 12-17 and includes that the at least one processor is further configured to receive, from the UE, the report of the QoE measurement information indicating a performed QoE measurement associated with the one or more types of services, and where the report is received via one of an application layer or an RRC layer for processing at a RAN.

Aspect 19 may be combined with any of aspects 12-18 and includes that the performed QoE measurement associated with the one or more types of services is based on a first QoE measurement stored at the application layer in a first application layer container reported to the RAN and a second QoE measurement stored at the application layer in a second application layer container reported to a QoE server.

Aspect 20 may be combined with any of aspects 12-18 and includes that the at least one processor is further configured to transmit, to the UE, a second report of information associated with at least one of a RAN decodable QoE configuration for storage of the one or more QoE measurements or a trigger condition for the report of the QoE measurement information, and where the one or more QoE measurements are triggered based on transmission of the second report of information at the RRC layer.

Aspect 21 may be combined with any of aspects 12-18 or 20 and includes that the performed QoE measurement associated with the one or more types of services further includes at least one of a first performed QoE measurement for a plurality of types of services of the one or more types of services, or a second performed QoE measurement on a plurality of occasions for one type of service of the one or more types of services, and where the QoE measurement information is stored at the RRC layer.

Aspect 22 may be combined with any of aspects 12-18 or 20-21 and includes that the at least one of the first performed QoE measurement for the plurality of types of services or the second performed QoE measurement on the plurality of occasions for the one type of service is based on at least one of a trace ID or a reference ID.

Aspect 23 is an apparatus for wireless communication at a UE including at least one processor coupled to a memory and configured to obtain, in association with UE capabilities information that one or more QoE measurements are supported at the UE while in an RRC idle mode or an RRC inactive mode, a set of QoE measurements associated with a service type; and transmit the obtained set of QoE measurements while in the RRC idle mode or the RRC inactive mode, after entering an RRC connected mode, the set of QoE measurements.

Aspect 24 may be combined with aspect 23 and includes that the one or more processors are further configured to store the QoE measurements based at least in part on the UE being in the RRC idle mode or the RRC inactive mode.

Aspect 25 may be combined with any of aspects 23-24 and includes that the one or more processors are further configured to provide, from an access stratum layer of the UE to an application layer of the UE associated with the service type, an indication for the application layer to stop sending QoE measurements to the access stratum layer of the UE.

Aspect 26 may be combined with any of aspects 23-25 and includes that providing the indication to stop sending QoE measurements to the access stratum layer of the UE is based at least in part on the UE entering the RRC idle mode or the RRC inactive mode.

Aspect 27 may be combined with any of aspects 23-26 and includes that the one or more processors are further configured to provide, from an access stratum layer of the UE to an application layer of the UE associated with the service type, an indication to resume sending QoE measurements to the access stratum layer of the UE.

Aspect 28 may be combined with any of aspects 23-27 and includes that providing the indication to resume sending QoE measurements to the access stratum layer of the UE is based at least in part on the UE entering the RRC connected mode.

Aspect 29 may be combined with any of aspects 23-28 and includes that the one or more processors are further configured to enter the RRC idle mode or the RRC inactive mode based at least in part on the UE receiving, from a base station, an RRC release, where the RRC release indicates that the UE is to continue obtaining QoE measurements while in the RRC idle mode or the RRC inactive mode.

Aspect 30 may be combined with any of aspects 23-29 and includes that the RRC release indicates that the UE is to continue obtaining QoE measurements while in the RRC idle mode or the RRC inactive mode based at least in part on the UE remaining in a current tracking area or a current radio access network-based notification area.

Aspect 31 may be combined with any of aspects 23-30 and includes that the one or more processors are further configured to provide, from an access stratum layer of the UE to an application layer of the UE associated with the service type, an indication to stop sending QoE measurements to the access stratum layer of the UE; and provide, from the access stratum layer of the UE to the application layer of the UE associated with the service type, an indication to resume sending QoE measurements to the access stratum layer of the UE based at least in part on the UE performing a cell reselection process.

Aspect 32 may be combined with any of aspects 23-31 and includes that the RRC release indicates that the UE is to continue obtaining QoE measurements while in the RRC idle mode or the RRC inactive mode based at least in part on the UE remaining in a set of tracking areas or a set of radio access network-based notification areas.

Aspect 33 may be combined with any of aspects 23-32 and includes that the one or more processors are further configured to: provide, from an access stratum layer of the UE to an application layer of the UE associated with the service type, an indication to stop sending QoE measurements to the access stratum layer of the UE; and provide, from the access stratum layer of the UE to the application layer of the UE associated with the service type, an indication to resume sending QoE measurements to the access stratum layer of the UE based at least in part on the UE determining that a reselected cell is not in the set of tracking areas or the set of radio access network-based notification areas.

Aspect 34 is an apparatus for wireless communication at a UE including at least one processor coupled to a memory and configured to obtain, in association with UE capabilities information that one or more QoE measurements are supported at the UE while in an RRC idle mode or an RRC inactive mode, one or more QoE measurements associated with a service type; and initiate an RRC connection setup or an RRC connection resume based at least in part on obtaining the one or more QoE measurements.

Aspect 35 may be combined with aspect 34 and includes that the one or more processors are further configured to enter the RRC idle mode or the RRC inactive mode based at least in part on the UE receiving, from a base station, an RRC release, where the RRC release indicates that the UE is to initiate the RRC connection setup or the RRC connection resume based at least in part on the UE obtaining the one or more QoE measurements.

Aspect 36 may be combined with any of aspects 34-35 and includes that the RRC release indicates that the UE is to initiate the RRC connection setup or the RRC connection resume based at least in part on the UE obtaining the one or more QoE measurements and based at least in part on the UE remaining in a current tracking area or a current radio access network-based notification area.

Aspect 37 may be combined with any of aspects 34-36 and includes that the RRC release indicates that the UE is to initiate the RRC connection setup or the RRC connection resume based at least in part on the UE obtaining the one or more QoE measurements and based at least in part on the UE remaining in a set of tracking areas or a set of radio access network-based notification areas.

Aspect 38 may be combined with any of aspects 34-37 and includes that initiating the RRC connection setup or the RRC connection resume is based at least in part on a number of the one or more QoE measurements satisfying a QoE measurements threshold.

Aspect 39 may be combined with any of aspects 1-38 and further includes at least one of an antenna or a transceiver coupled to the at least one processor.

Aspect 40 is a method of wireless communication for implementing any of aspects 1-38.

Aspect 41 is an apparatus for wireless communication including means for implementing any of aspects 1-38.

Aspect 42 is a computer-readable medium storing computer executable code, the code when executed by at least one processor causes the at least one processor to implement any of aspects 1-38.

What is claimed is:

1. An apparatus for wireless communication at a user equipment (UE), comprising:
    at least one memory; and
    at least one processor coupled to the at least one memory and, based at least in part on information stored in the at least one memory, the at least one processor is configured to:
        transmit, to a base station, one or more UE capabilities indicating whether the UE can perform multiple instances of a set of quality of experience (QoE) measurements associated with one or more types of services while the UE is in at least one of a radio resource control (RRC) idle state or an RRC inactive state with respect to each type of service of the one or more types of services; and
        receive, from the base station, a QoE measurement information configuration for reporting QoE measurement information associated with the one or more types of services based on the one or more UE capabilities for performing the multiple instances of the set of QoE measurements while the UE is in at least one of the RRC idle state or the RRC inactive state with respect to each type of service of the one or more types of services.

2. The apparatus of claim 1, wherein the one or more types of services include a plurality of types of services, and the one or more UE capabilities comprise at least one UE capability indicating whether the UE can simultaneously perform the multiple instances of the set of QoE measurements for the plurality of types of services.

3. The apparatus of claim 1, wherein the one or more UE capabilities comprise at least one UE capability indicating whether the UE can perform the multiple instances of the set of QoE measurements for one type of service of the one or more types of services.

4. The apparatus of claim 1, wherein the one or more UE capabilities comprise one UE capability for each type of service of the one or more types of services, each UE capability indicating whether the UE can perform at least one instance of the multiple instances of the set of QoE measurements for a corresponding type of service while the UE is in the RRC idle state or the RRC inactive state with respect to the corresponding type of service.

5. The apparatus of claim 1, wherein the one or more UE capabilities comprise a plurality of UE capabilities for each type of service of the one or more types of services, wherein the plurality of UE capabilities comprise a first UE capability indicating whether the UE can perform at least one instance of the multiple instances of the set of QoE measurements for a corresponding type of service while the UE is in an RRC connected state with respect to the corresponding type of service, and a second UE capability indicating whether the UE can perform at least one instance of the multiple instances of the set of QoE measurements for the corresponding type of service while the UE is in at least one of the RRC idle state or the RRC inactive state with respect to the corresponding type of service.

6. The apparatus of claim 1, wherein the at least one processor is further configured to:
   transmit, to the base station, a report of the QoE measurement information indicating the performed multiple instances of the set of QoE measurements, wherein, to transmit the report, the at least one processor is configured to:
   transmit the report via one of an application layer at the UE or an RRC layer at the UE for processing at a radio access network (RAN).

7. The apparatus of claim 6, wherein to perform the multiple instances of the set of QoE measurements associated with the one or more types of services, the at least one processor is configured to:
   perform a first QoE measurement of the set of QoE measurements and store the first QoE measurement at the application layer in a first application layer container for reporting to the RAN and perform a second QoE measurement of the set of QoE measurements and store the second QoE measurement at the application layer in a second application layer container for reporting to a QoE server.

8. The apparatus of claim 6, wherein the at least one processor is further configured to:
   receive, from the RAN, a second report of information associated with at least one of a RAN decodable configuration for storing the set of QoE measurements or a trigger condition for reporting the set of QoE measurements, wherein, to transmit the report, the at least one processor is configured to:
   transmit the report of the QoE measurement information in response to a reception of the second report of information at the RRC layer.

9. The apparatus of claim 6, wherein, to perform the multiple instances of the set of QoE measurements associated with the one or more types of services, the at least one processor is configured to at least one of:
   perform the multiple instances of the set of QoE measurements for a plurality of types of services of the one or more types of services, or
   perform the multiple instances of the set of QoE measurements during a plurality of occasions for one type of service of the one or more types of services, wherein the QoE measurement information is stored at the RRC layer.

10. The apparatus of claim 9, wherein to perform the multiple instances of the set of QoE measurements for the plurality of types of services or to perform the multiple instances of the set of QoE measurements on the plurality of occasions for the one type of service, the at least one processor is configured to:
    perform the multiple instances of the set of QoE measurements for the plurality of types of services or to perform the multiple instances of the set of QoE measurements on the plurality of occasions for the one type of service based on at least one of a trace identifier (ID) or a reference ID.

11. The apparatus of claim 1, further comprising at least one of an antenna or a transceiver coupled to the at least one processor, wherein the at least one processor is configured to:
    transmit the one or more UE capabilities via at least one of the antenna or the transceiver; and
    receive the QoE measurement information configuration via at least one of the antenna or the transceiver.

12. An apparatus for wireless communication at a base station, comprising:
    at least one memory; and
    at least one processor coupled to the at least one memory and, based at least in part on information stored in the at least one memory, the at least one processor is configured to:
    receive, from a user equipment (UE), one or more UE capabilities indicating whether the UE can perform multiple instances of a set of quality of experience (QoE) measurements associated with one or more types of services at the UE while the UE is in at least one of a radio resource control (RRC) idle state or an RRC inactive state with respect to each type of service of the one or more types of services;
    identify whether the base station can decode QoE measurement information for the multiple instances of the set of QoE measurements based on at least one of (a) the one or more UE capabilities for performing the multiple instances of the set of QoE measurements or (b) an indication from an operations, administration and maintenance (OAM) server; and
    transmit, to the UE, a QoE measurement information configuration for a report of the QoE measurement information based on whether the base station can decode the QoE measurement information for the multiple instances of the set of QoE measurements while the UE is in at least one of the RRC idle state or the RRC inactive state with respect to each type of service of the one or more types of services.

13. The apparatus of claim 12, wherein the one or more types of services include a plurality of types of services, and the one or more UE capabilities comprise at least one UE capability indicating whether the UE can simultaneously perform the multiple instances of the set of QoE measurements for the plurality of types of services.

14. The apparatus of claim 12, wherein the one or more UE capabilities comprise at least one UE capability indicating whether the UE can perform the multiple instances of the set of QoE measurements for at least one type of service of the one or more types of services.

15. The apparatus of claim 12, wherein the one or more UE capabilities comprise one UE capability for each type of service of the one or more types of services, each UE capability indicating whether the UE can perform at least one instance of the multiple instances of the set of QoE measurements for a corresponding type of service while the UE is in the RRC idle state or the RRC inactive state with respect to the corresponding type of service.

16. The apparatus of claim 12, wherein the one or more UE capabilities comprise a plurality of UE capabilities for each type of service of the one or more types of services, wherein the plurality of UE capabilities comprise a first UE capability indicating whether the UE can perform at least one instance of the multiple instances of the set of QoE measurements for a corresponding type of service while the UE is in an RRC connected state with respect to the corresponding type of service, and a second UE capability indicating whether the UE can perform at least one instance of the multiple instances of the set of QoE measurements for the corresponding type of service while the UE is in at least one of the RRC idle state or the RRC inactive state with respect to the corresponding type of service.

17. The apparatus of claim 12, wherein the at least one processor is further configured to:
- receive, from the UE, the report of the QoE measurement information indicating a performance of the multiple instances of the set of QoE measurements associated with the one or more types of services in response to the transmitted QoE measurement information, and wherein to receive the report, the at least one processor is configured to:
  - receive the report via one of an application layer or an RRC layer for processing at a RAN.

18. The apparatus of claim 17, wherein the performance of the multiple instances of the set of QoE measurements associated with the one or more types of services is based on a first QoE measurement stored at the application layer in a first application layer container reported to the RAN and a second QoE measurement stored at the application layer in a second application layer container reported to a QoE server.

19. The apparatus of claim 17, wherein the at least one processor is further configured to:
- transmit, to the UE, a second report of information associated with at least one of a RAN decodable QoE configuration for storage of the set of QoE measurements or a trigger condition for the report of the QoE measurement information, and wherein the performance of the multiple instances of the set of QoE measurements is triggered based on transmission of the second report of information at the RRC layer.

20. The apparatus of claim 17, wherein the performance of the multiple instances of the set of QoE measurements associated with the one or more types of services further includes at least one of a first performance of at least one instance of the multiple instances of the set of QoE measurements for a plurality of types of services of the one or more types of services, or a second performance of at least one instance of the multiple instances of the set of QoE measurements on a plurality of occasions for one type of service of the one or more types of services, and wherein the QoE measurement information is stored at the RRC layer.

21. The apparatus of claim 20, wherein at least one of the first performance of at least one instance of the multiple instances of the set of QoE measurements for the plurality of types of services or the second performance of at least one instance of the multiple instances of the set of QoE measurements on the plurality of occasions for the one type of service is based on at least one of a trace identifier (ID) or a reference ID.

22. The apparatus of claim 12, further comprising at least one of an antenna or a transceiver coupled to the at least one processor, wherein the at least one processor is configured to:
- receive the one or more UE capabilities via at least one of the antenna or the transceiver; and
- transmit the QoE measurement information configuration via at least one of the antenna or the transceiver.

23. A method of wireless communication at a user equipment (UE), comprising:
- transmitting, to a base station, one or more UE capabilities indicating whether the UE can perform multiple instances of a set of quality of experience (QoE) measurements associated with one or more types of services while the UE is in at least one of a radio resource control (RRC) idle state or an RRC inactive state with respect to each type of service of the one or more types of services; and
- receiving, from the base station, a QoE measurement information configuration for reporting QoE measurement information associated with the one or more types of services based on the one or more UE capabilities for performing the multiple instances of the set of QoE measurements while the UE is in at least one of the RRC idle state or the RRC inactive state with respect to each type of service of the one or more types of services.

24. The method of claim 23, wherein the one or more types of services include a plurality of types of services, and the one or more UE capabilities comprise at least one UE capability indicating whether the UE can simultaneously perform the multiple instances of the set of QoE measurements for the plurality of types of services.

25. The method of claim 23, wherein the one or more UE capabilities comprise at least one UE capability indicating whether the UE can perform the multiple instances of the set of QoE measurements for one type of service of the one or more types of services.

26. The method of claim 23, further comprising:
- transmitting, to the base station, a report of the QoE measurement information indicating the performed set of QoE measurements, wherein transmitting the report comprises:
  - transmitting the report via one of an application layer at the UE or an RRC a radio resource control (RRC) layer at the UE for processing at a radio access network (RAN).

27. A method of wireless communication at a base station, comprising:
- receiving, from a user equipment (UE), one or more UE capabilities indicating whether the UE can perform multiple instances of a set of quality of experience (QoE) measurements associated with one or more types of services at the UE while the UE is in at least one of a radio resource control (RRC) idle state or an RRC inactive state with respect to each type of service of the one or more types of services;
- identifying whether the base station can decode QoE measurement information for the multiple instances of the set of QoE measurements based on at least one of (a) the one or more UE capabilities for performing the multiple instances of the set of QoE measurements or (b) an indication from an operations, administration and maintenance (OAM) server; and
- transmitting, to the UE, a QoE measurement information configuration for a report of the QoE measurement information based on whether the base station can decode the QoE measurement information for the multiple instances of the set of QoE measurements while the UE is in at least one of the RRC idle state or the RRC inactive state with respect to each type of service of the one or more types of services.

* * * * *